United States Patent
Feng et al.

(10) Patent No.: US 11,925,997 B1
(45) Date of Patent: Mar. 12, 2024

(54) WIRE BILLET BUTT-WELDING APPARATUS AND WIRE BILLET BUTT-WELDING METHOD

(71) Applicant: ZHEJIANG HAILIANG CO., LTD., Zhejiang (CN)

(72) Inventors: Huanfeng Feng, Shaoxing (CN); Zhangquan Zhu, Shaoxing (CN); Gangfeng Sun, Shaoxing (CN); Shaojun Jiang, Shaoxing (CN); Lianyun Wei, Shaoxing (CN)

(73) Assignee: ZHEJIANG HAILIANG CO., LTD., Shaoxing (CN)

( * ) Notice: Subject to any disclaimer, the term of this patent is extended or adjusted under 35 U.S.C. 154(b) by 0 days.

(21) Appl. No.: 18/242,191

(22) Filed: Sep. 5, 2023

(30) Foreign Application Priority Data

Mar. 9, 2023 (CN) .......................... 202310246464.X
Mar. 9, 2023 (CN) .......................... 202310254309.2
Aug. 17, 2023 (WO) ................ PCT/CN2023/113537

(51) Int. Cl.
*B23K 20/00* (2006.01)
*B23K 20/02* (2006.01)

(52) U.S. Cl.
CPC .................................. *B23K 20/028* (2013.01)

(58) Field of Classification Search
CPC .. B23K 20/028; B23K 2101/32; B23K 11/04; B23K 11/0026; B23K 20/004; B21F 15/00
See application file for complete search history.

(56) References Cited

U.S. PATENT DOCUMENTS

| 2,644,069 | A | * | 6/1953 | Pityo | .................. | B23K 11/0026 |
| | | | | | | 219/78.15 |
| 2,923,183 | A | * | 2/1960 | Johnson | ............... | B23K 20/028 |
| | | | | | | 228/3.1 |

(Continued)

FOREIGN PATENT DOCUMENTS

| CN | 110142527 A | 8/2019 |
| CN | 210848856 U | 6/2020 |

(Continued)

OTHER PUBLICATIONS

Nov. 20, 2023 Written Opinion and International Search Report issued in International Application PCT/CN2023/113537.

*Primary Examiner* — Erin B Saad
(74) *Attorney, Agent, or Firm* — Oliff PLC

(57) ABSTRACT

To solve the problems of conventional wire billet butt-welding such as high labor intensity, potential safety hazards, and low production efficiency, the disclosure provides a wire billet butt-welding apparatus and a wire billet butt-welding method. The wire billet butt-welding method comprises: S1: preparing a stock, S2: rotating a butt-welding stock receiver to a stock receiving position, and feeding a first coil of wire billet to a stock receiving rod of the butt-welding stock receiver; S3: welding the first coil of wire billet and the second coil of wire billet on a rotary plate at the butt-welding position end-to-head; S4: rotating the butt-welding stock receiver and the second coil of wire billet to the stock receiving position; S5: rotating the stock receiving rod to rotate to tighten the wire billet between the first coil of wire billet and the second coil of wire billet; and S6: repeating steps S3 to S5 to complete butt-welding operations on the $3^{rd}$ to $n^{th}$ coils of wire billet sequentially. The solution implements semi-automated butt-welding operation; with provision of the rotary plate and the butt-welding stock receiver, enables automatic loading, automatic flipping, and (Continued)

automatic discharging, which reduces the manual workload, lowers the safety hazards, and improves the production efficiency.

11 Claims, 17 Drawing Sheets

(56) References Cited

U.S. PATENT DOCUMENTS

| | | | | |
|---|---|---|---|---|
| 3,044,328 A * | 7/1962 | Zysk | ............... | B23K 20/028 228/3.1 |
| 3,093,018 A * | 6/1963 | Rozmus | ............... | B23K 11/04 228/171 |
| 3,384,731 A * | 5/1968 | Draving | ............... | B23K 11/0026 219/104 |
| 3,606,131 A * | 9/1971 | Rozmus et al. | ...... | B23K 20/028 228/115 |
| 3,653,571 A * | 4/1972 | Rozmus | ............... | B23K 20/028 228/115 |
| 3,680,761 A * | 8/1972 | Rozmus | ............... | B23K 20/028 228/3.1 |
| 3,705,288 A * | 12/1972 | Kabana | ............... | B23K 11/04 219/101 |
| 4,049,414 A * | 9/1977 | Smith | ............... | G02B 6/2551 385/98 |
| 4,357,514 A * | 11/1982 | Chason | ............... | H01G 9/012 219/113 |
| 4,382,322 A * | 5/1983 | Fajt | ............... | H01J 9/48 228/103 |
| 4,454,941 A * | 6/1984 | Fajt | ............... | B65G 47/1492 198/463.4 |
| 4,462,518 A * | 7/1984 | Fajt | ............... | B65G 47/1492 198/470.1 |
| 6,127,646 A * | 10/2000 | Aebersold | ............... | B23K 37/0408 228/49.4 |
| 11,806,815 B2 * | 11/2023 | Bhushan | ............... | B23K 31/125 |
| 2020/0406405 A1 * | 12/2020 | Bhushan | ............... | B23K 31/125 |

FOREIGN PATENT DOCUMENTS

| | | |
|---|---|---|
| CN | 111958103 A | 11/2020 |
| CN | 215615716 U | 1/2022 |
| CN | 116276071 A | 6/2023 |
| RU | 2321479 C1 | 4/2008 |

* cited by examiner

WIRE BILLET BUTT-WELDING APPARATUS AND WIRE BILLET BUTT-WELDING METHOD

FIELD

The subject matter described herein relates to wire billet butt welding, and particularly relates to a wire billet butt-welding apparatus and a wire billet butt-welding method.

BACKGROUND

In pipe or wire billet manufacturing, butt welding is frequently applied to join separate segments of wire billet end-to-end to obtain a continuous wire billet with a desired length. In an existing butt-welding process, two coils of wire billet are manually welded end-to-end with the joint being ground, and then the butt-welded two coils of wire billet are manually flipped to be re-ordered into an integral coil, followed by next round of welding. Since a coil of wire billet is usually heavy and easy to become loose, the manual flipping operation is not only highly physically demanding but also prone to safety hazards.

In view of the above, conventional wire billet butt-welding methods are not only less productive and highly physically demanding, but also have safety hazards. Therefore, a novel wire billet butt-welding method is provided herein.

SUMMARY

To overcome problems of conventional wire billet butt-welding such as high labor intensity, potential safety hazards, and low productivity, the disclosure provides a wire billet butt-welding apparatus, which enables automatic loading, automatic flipping, and automatic discharging; the highly automated level improves work efficiency, and reduces the labor intensity of operators.

The disclosure provides a wire billet butt-welding apparatus, comprising: a rotary plate and a butt-welding stock receiver, the rotary plate and the butt-welding stock receiver being arranged in adjacency, a stock receiving rod being provided on the butt-welding stock receiver, the butt-welding stock receiver being rotatable to enable the stock receiving rod to switch between a butt-welding position, a stock receiving position, and a stock discharging position, a plurality of mounting portions being circumferentially provided on the rotary plate, each mounting portion being rotatable about a central axis of the rotary plate, a stock pushing mechanism being configured to push a coil of wire billet from the mounting portion to the stock receiving rod being provided in a central portion of the rotary plate.

In the above technical solution, the wire billet butt-welding apparatus may realize semi-automatic butt-welding operations; the rotary plate and the butt-welding stock receiver may realize automatic loading, automatic flipping, and automatic discharging, which reduces the manual workload, lowers the safety hazards, improves the production efficiency, and implements the continuous welding of heavy coils.

Preferably, the wire billet butt-welding apparatus further comprises a wire billet butt-welder, the wire billet butt-welder being disposed at the butt-welding position.

Preferably, the stock receiving rod comprises two rod bodies arranged in parallel at an interval, the two rod bodies being mutually independent and rotatable synchronously about a same axis.

Preferably, each of the mounting portions is provided with two mounting bars parallel to each other and equally spaced from the two rod bodies.

Preferably, the stock pushing mechanism comprises a stock pushing rod and a stock push driving part, wherein while the mounting portion is rotating, the stock pushing mechanism stays still such that one end of the stock pushing rod keeps facing the stock receiving position, and the stock push driving part drives the stock pushing rod to perform an intermittent retract-extend motion.

Preferably, the butt-welding position and the stock discharging position are distributed at two sides of the stock receiving position.

Preferably, the wire billet butt-welder comprises a horizontal rail and a sliding platform slidingly connected on the horizontal rail, a welding mechanism and a welding-scar removing mechanism which are oppositely disposed being fixed on the sliding platform, the welding-scar removing mechanism comprising a punching part, a grinding part, a sliding rack, and a vertical rail, the vertical rail being fixed on the sliding platform, the punching part and the grinding part being fixed on the sliding rack and slidingly connected to the vertical rail via the sliding rack, wherein the grinding part is disposed below the punching part.

Preferably, the wire billet butt-welder further comprises a stock unloading part, the stock unloading part comprising a stock pulling hook, a stock pulling cylinder, a stock unloading rail, and a stock unloading hook, the stock pulling cylinder being fixed to an upper end of the vertical rail, the stock pulling hook being fixed on an extension rod of the stock pulling cylinder, one end of the stock pulling hook facing an area between the welding mechanism and the welding-scar removing mechanism, the stock unloading rail being mounted at an upper end of the welding mechanism along a horizontal direction, the stock unloading hook being slidingly connected on the stock unloading rail, a movement range of the stock unloading hook being intersected with a movement range of the stock pulling hook.

A wire billet butt-welding apparatus comprises a rotary plate, a butt-welding stock receiver, and a wire billet butt-welder for welding, the wire billet butt-welder comprising a welding mechanism and a welding-scar removing mechanism, the welding-scar removing mechanism comprising a punching part, a grinding part, a sliding rack, and a vertical rail, the vertical rail being fixed on the sliding platform, the punching part and the grinding part being fixed on the sliding rack and slidingly connected to the vertical rail via the sliding rack, wherein the grinding part is disposed below the punching part.

Preferably, the punching part comprises an upper-left punch head, a lower-left punch head, an upper-right punch head, and a lower-right punch head, and the upper-left punch head, the lower-left punch head, the upper-right punch head, and the lower-right punch head punch synchronously to form a circular punching area.

Preferably, the grinding part comprises a C-shaped plate, a grinding rack, a friction wheel, and a sanding belt, the grinding rack being fixedly connected to the C-shaped plate, the friction wheel being provided on the grinding rack, the sanding belt being mounted on the friction wheel, the C-shaped plate being configurable to drive the grinding rack to rotate about an axis of the C-shaped plate, a horizontal movement of the sliding platform and a vertical movement of the sliding rack enabling the welding mechanism, the punching part, and the grinding part to move sequentially to a workpiece position to operate.

Preferably, the grinding part further comprises a grinding clamping fixing portion and a grinding driving portion, the grinding driving portion comprising a drive motor, driving wheels, and a synchronization belt; there are four driving wheels being provided and distributed outside the C-shaped plate, wheel faces of the four driving wheels abutting against an outer sidewall of the C-shaped plate to limit the C-shaped plate, an output end of the drive motor being connected to one of the driving wheels, the plurality of driving wheels being connected with each other via the synchronization belt, a rubber layer being applied over the outer sidewall of the C-shaped plate; the grinding clamping fixing portion is configured to clamp a to-be-ground wire billet, the grinding clamping fixing portion comprising two grinding clamping unit distributed at two sides of the grinding part.

Preferably, the punching part comprises a first clamping assembly, the first clamping assembly comprising a left clamping unit and a right clamping unit, the left clamping unit comprising a lower-left stationary plate and an upper-left movable plate, the right clamping unit comprising a lower-right stationary plate and an upper-right movable plate, the upper-left punch head being mounted on the upper-left movable plate, the lower-left punch head being mounted on the lower-left stationary plate, the upper-right punch head being mounted on the upper-right movable plate, the lower-right punch head being mounted on the lower-right stationary plate, a connecting line between centers of the upper-left punch head and the lower-left punch head being crisscrossed with a connecting line between centers of the upper-right punch head and the lower-right punch head, a V-shaped guide groove being provided on each of the lower-left stationary plate, the upper-left movable plate, the lower-right stationary plate, and the upper-right movable plate, an arc-shaped portion with a same profile as a wire billet surface being formed on a bottom of the V-shaped guide groove.

A wire billet butt-welding method, based on the wire billet butt-welding apparatus described above, including the following steps:

S1: pre-placing a plurality of coils of wire billet on the rotary plate along a circumferential direction;

S2: rotating a butt-welding stock receiver to a stock receiving position, and feeding a first coil of wire billet to a stock receiving rod of the butt-welding stock receiver;

S3: carrying, by the butt-welding stock receiver, the first coil of wire billet to rotate to the butt-welding position, and welding the first coil of wire billet to a second coil of wire billet end-to-head;

S4: rotating the butt-welding stock receiver to the stock receiving position again, and meanwhile, rotating the rotary plate such that the second coil of wire billet rotates to the stock receiving position;

S5: feeding, by the rotary plate, the second coil of wire billet to the stock receiving rod of the butt-welding stock receiver;

S6: repeating S3-S5 to sequentially perform butt-welding operation with respect of 3rd-nth coils of wire billet;

S7: rotating the butt-welding stock receiver to the stock discharging position, whereby the butt-welded 1st-nth coils of wire billet are discharged as an integral coil.

With this technical solution, the wire billet butt-welding method may realize semi-automatic butt-welding operations; the rotary plate and the butt-welding stock receiver may realize automatic loading, automatic flipping, and automatic discharging, which reduces the manual workload, lowers the safety hazards, improves the production efficiency, and implements the continuous welding of heavy coils.

Preferably, in S5, before the rotary plate feeds the second coil of wire billet to the stock receiving rod of the butt-welding stock receiver, the stock receiving rod is rotated to tighten the wire billet between the first coil of wire billet and the second coil of wire billet.

In the above technical solution, tightening refers to winding the wire billet between the butt-welded first coil of wire billet and second coil of wire billet such that the wire billet being integrally wound on the coil of the first wire billet, which guarantees the integrity of the two butt-welding joined coils of wire billet and avoids the loose wire billet between the coils of wire billet from affecting transportation or being damaged due to collision with other structures during subsequent transportation and processing.

Preferably, in S4, while the second coil of wire billet is being rotated to the stock receiving position, the stock receiving rod is rotated to synchronously tighten the wire billet between the first coil of wire billet and the second coil of wire billet.

In the above technical solution, tightening refers to winding the wire billet between the butt-welded first coil of wire billet and second coil of wire billet such that the wire billet being integrally wound on the coil of the first wire billet, which guarantees the integrity of the two butt-welding joined coils of wire billet and avoids the loose wire billet between the coils of wire billet from affecting transportation or being damaged due to collision with other structures during subsequent transportation and processing. While the second coil of wire billet is rotating to the stock receiving position, it is synchronously tightened. The tightening may also occur when the rotary plate and the butt-welding stock receiver are rotating, preventing loose wire from being bent and damaged, or from being bent by clamping, whereby the product quality may be improved.

In conclusion, the disclosure offers at least the following advantageous effects: 1. By designing a rotary plate and pre-placing a plurality of coils of wire billet on the rotary plate, fast and automatic feeding is enabled via rotation of the rotary plate during the welding procedure, whereby feeding efficiency is enhanced. 2. After two coils of wire billet are welded, the stock receiving rod on the butt-welding stock receiver may automatically flip the coils of wire billet, which reduces the workload of manual flipping and offers reliable flipping, thereby reducing the safety hazards; 3. The disclosure enhances the wire billet butt-welding efficiency; 4. The disclosure enables tightening of the wire billet between the first coil of wire billet and the second coil of wire billet, avoiding the loose wire billet between the coils of wire billet from affecting transportation or being damaged due to collision with other structures during subsequent transportation and processing. 5. The disclosure enables synchronous tightening while the second coil of wire billet is rotating to the stock receiving position, preventing the loose wire from being bent and damaged, or from being bent by clamping when the rotary plate and the butt-welding stock receiver are rotating, whereby product quality may be improved. 6. The butt-welder may simultaneously perform multiple procedures including wire billet butt-welding, welding-scar punching and removal, grinding, and discharging, which simplifies operations and improves the production efficiency. 7. The four punch heads punching synchronously may remove the welding-scars protruding circumferentially from the wire billet welding joints, which enhances the welding-scar treatment efficiency. 8. The wire billet needn't be transported during the operation, avoiding the issues such as time and energy wasted on transferring the wire billet between various procedures, as well as the proneness to be damaged.

Figure 1:
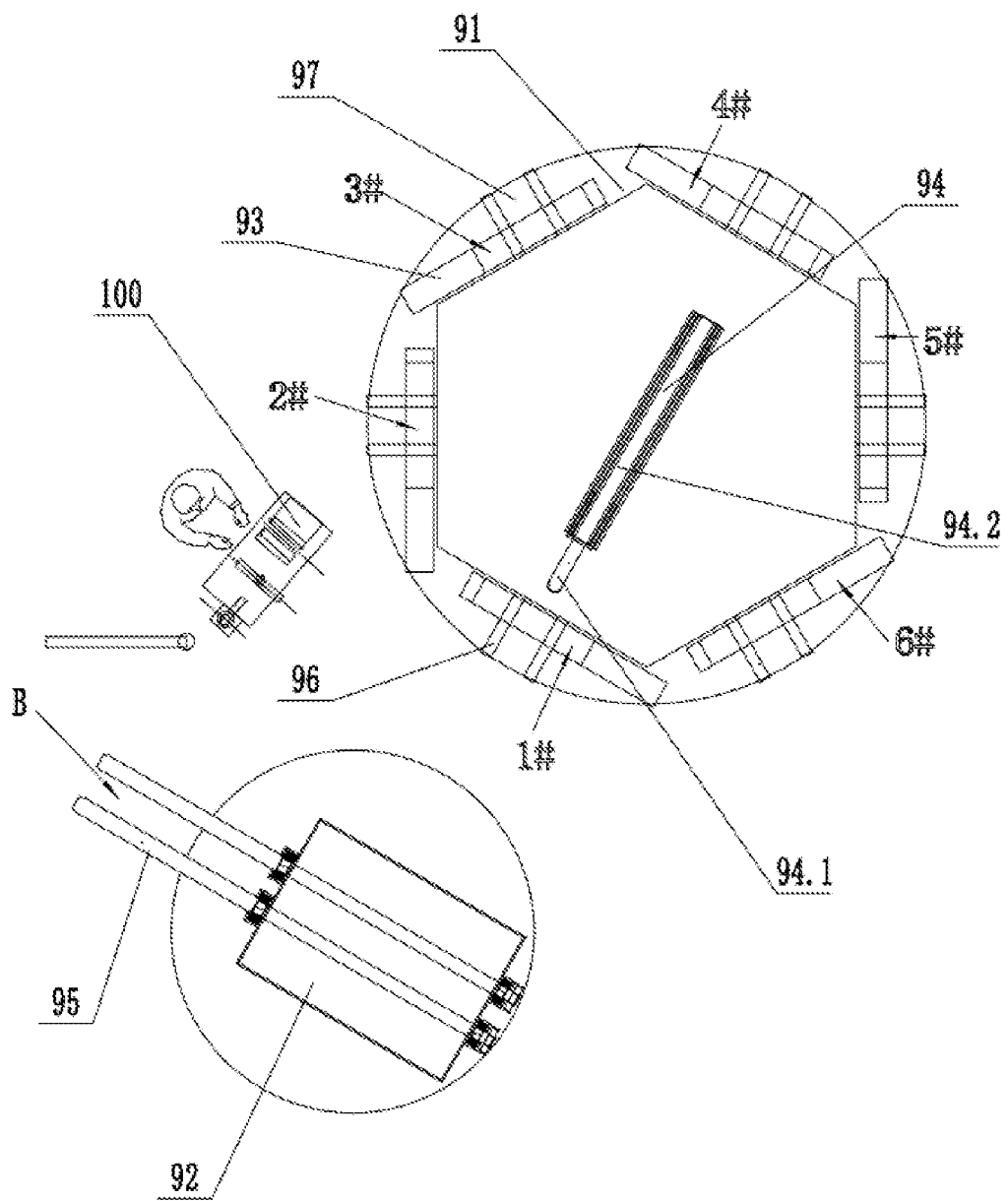
FIG. 1 is a schematic diagram showing an initial state of an overall structure of the disclosure.

Reference Numerals: 100. wire billet butt-welder; 1. horizontal rail; 2. sliding platform; 3. welding mechanism; 30. work station; 31. first straightening part; 32. second straightening part; 33. lower positioning die; 34. upper positioning die; 35. shearing part; 4. punching part; 41. upper-left punch head; 42. lower-left punch head; 43. upper-right punch head; 44. lower-right punch head; 45. first clamping assembly; 451. lower-left stationary plate; 452. upper-left movable plate; 453. lower-right stationary plate; 454. upper-right movable plate; 46. second clamping assembly; 461. lower stationary die; 462. upper movable die; 463. arc-shaped groove; 464. V-shaped guide groove; 465. upper guide plate; 466. lower guide plate; 5. grinding part; 51. C-shaped plate; 52. grinding rack; 53. friction wheel; 54. sanding belt; 55. first drive motor; 56. driving wheel; 57. lower stationary die; 58. upper movable die; 59. third drive part; 510. V-shaped guide groove; 6. sliding rack; 7. vertical rail; 81. stock pulling hook; 81.1 connecting portion; 81.2 movable portion; 82. stock pulling cylinder; 83. stock unloading rail; 84. stock unloading hook; 91. rotary plate; 92. butt-welding stock receiver; 93. coil of wire billet; 94. stock pushing mechanism; 94.1 stock pushing rod; 94.2 stock push driving part; 95. stock receiving rod; 96. mounting bar; 97. mounting portion; A. stock receiving position; B. butt-welding position; C. stock discharging position.

DETAILED DESCRIPTION

Hereinafter, the technical solutions of the disclosure will be described in a clear and comprehensive manner through example embodiments with reference to the accompanying drawings. It is noted that the embodiments described infra are only preferred examples, not the entirety of the embodiments of the disclosure. All other embodiments derived by those skilled in the art based on the example embodiments without exercise of inventive efforts shall fall within the scope of protection of the disclosure.

Embodiment 1: Referring to FIGS. 1 to 7, a wire billet butt welding apparatus comprises: a rotary plate 91 and a butt-welding stock receiver 92; a stock receiving rod 95 is provided on the butt-weld stocker receiver 92; the butt-welding stock receiver 92 is rotatable to enable the stock receiving rod 95 to switch between butt-welding position B, stock receiving position A, and stock discharging position C; the stock receiving rod 95 comprises two rod bodies arranged in parallel at an interval, the two rod bodies being independent from each other and operable to rotate synchronously about a same axis; a plurality of mounting portions 97 for placing coils of wire billet 93 are arranged along the periphery of the rotary plate 91, the mounting portions 97 being rotatable about the central axis of the rotary plate 91, each mounting portion 97 being provided with two mounting bars 96 which are parallel to each other and equally spaced from the two rod bodies; a stock pushing mechanism 94 is provided in the central portion of the rotary plate 91, the stock pushing mechanism 94 comprising a stock pushing rod 94.1 and a stock push driving part 94.2; when the mounting portions 97 rotate, the stock pushing mechanism 94 stays still, such that one end of the stock pushing rod 94.1 constantly faces the stock receiving position A; and the stock push driving part 94.2 drives the stock pushing rod 94.1 to perform an intermittent retract-extend motion.

To transfer the coils of wire billet 93 on the rotary plate 91 to the butt-welding stock receiver 92, the disclosure provides a design of disposing the stock pushing mechanism 94 in the central portion of the rotary plate 91, the stock pushing mechanism 94 comprising a stock pushing rod 94.1 and a stock push driving part 94.2, one end of the stock pushing rod 94.1 facing the stock receiving position A, the stock push driving part 94.2 driving the stock pushing rod 94.1 to perform an intermittent retract-extend motion. The stock pushing structure enables automatic convey of the coils of wire billet 93 on the rotary plate 91 to the butt-welding stock receiver 92, which reduces the manual labor and ensures the continuous proceeding of butt-weld joining.

To reduce footprint of the entire butt-welding operation, in the disclosure, the butt-welding position B and the stock discharging position C are arranged at two sides of the stock receiving position A. This arrangement may reduce transfer stroke of the stock between different positions during the entire operation process, whereby the production efficiency is enhanced.

In the disclosure, the two rod bodies of the stock receiving rod 95 are driven to rotate by the same drive part, which reduces the equipment cost and facilitates the layout; in addition, this design may better ensure rotating synchronization of the two rod bodies, thereby ensuring the stability in flipping of the coils of wire billet 93.

Embodiment 2

Based on the embodiment 1, the wire billet butt-welding apparatus further comprises a wire billet butt-welder 100, the wire billet butt-welder 100 being disposed at the butt-welding position B. The wire billet butt-welder 100 is configured to collectively perform a wire billet butt-welding operation, a seam welding-scar removing operation by punching, and a seam grinding operation. As illustrated in FIGS. 8-19, the wire billet butt-welder 100 comprises a horizontal rail 1 and a sliding platform 2 slidingly connected on the horizontal rail 1, a welding mechanism 3 and a welding-scar removal mechanism oppositely disposed being provided on the sliding platform 2. As can be seen from the figures that, the welding mechanism 3 and the welding-scar removal mechanism are integrated and can slide horizontally along the horizontal rail 1 as an entirety.

The welding-scar removal mechanism comprises a punching part 4, a grinding part 5, a sliding rack 6, and a vertical rail 7, the vertical rail 7 being fixed on the sliding platform 2, the punching part 4 and the grinding part 5 being fixed on the sliding rack 6 and slidingly connected to the vertical rail 7 via the sliding rack 6. It can be seen that the punching part 4 and the grinding part 5 are integrated via the sliding rack 6, such that they may slide up and down along the vertical rail 7 as an entirety, where the grinding part 5 is disposed below the punching part 4, and the operate in the same vertical plane. The punching part 4 comprises an upper-left punch head 41, a lower-left punch head 42, an upper-right punch head 43, and a lower-right punch head 44, the upper-left punch head 41, the lower-left punch head 42, the upper-right punch head 43, and the lower-right punch head 44 punching synchronously to form a circular punched area, punching directions of the four punch heads being along the axial direction of the wire billet. The grinding part 5 comprises a C-shaped plate 51, a grinding rack 52, a friction wheel 53, and a sanding belt 54, where the grinding rack 52 is fixedly connected to the C-shaped plate 51, three friction wheels 53 distributed circumferentially are disposed on the grinding rack 52, and the sanding belt 54 is mounted on the friction wheels 53; the C-shaped plate 51 can bring the grinding rack 52 to rotate about the axis of the C-shaped plate 51; horizontal movement of the sliding platform 2 and vertical movement of the sliding rack 6 enable the welding mechanism 3, the punching part 4, and the grinding part 5 to sequentially move to the workpiece position to perform corresponding operations.

The integrally designed butt-welder designed in the present invention can collectively perform a plurality of procedures of wire billet butt-welding, such as welding, welding-scar removal by punching the seam, seam grinding, etc. The welding assembly in the welding mechanism 3 may adopt an existing structure, so long as it can butt-weld the wire billet. A horizontal rail 1 and a vertical rail 7 are provided on the butt-welder, such that the welding mechanism 3 may move horizontally, the punching part 4 and the grinding part 5 may not only move horizontally with the welding mechanism 3 along the horizontal rail 1, but also may separately move vertically along the vertical rail 7. The wire billet in the equipment may be fixed by an automated device; or, before performing the operations noted supra, two coils of wire billet to be welded may be manually fixed end-to-head in a stationary fixture on the wire billet butt-welder. During the operations noted supra, the position of wire billet is fixed, and the actions are implemented by movement of the operating parts on the butt-welder. Specifically, via combinations between the horizontal and vertical movements, the operating parts are moved to the welding scar position of the wire billet to work. Firstly, the welding mechanism 3 translates to the wire billet position, where the two coils of wire billet are aligned end-to-head and then butt-weld joined; after the welding, residual solder is likely left at the seam position, which generally protrudes on the surface of the wire billet; secondly, the sliding platform 2 and the sliding rack 6 move such that the punching part 4 moves to the welding-scar position of the wire billet, where the four punch heads of the punching part 4 synchronously punch the residual solder protruding on the wire billet, realizing coarse processing to the excessive solder; the punching procedure removes a large part of the residual solder, but there still lefts a little solder (burrs, flashes, etc.), and the punching operation cannot guarantee surface smoothness of the seam position either; finally, the sliding rack 6 moves upward such that the grinding part 5 moves to the welding-scar position of the wire billet, where the wire billet accesses the inside of the C-shaped plate 51 via an opening of the C-shaped plate 51, and then the C-shaped plate 51 drives, via the grinding rack 52, the sanding belt 54 to rotate circumferentially around the seam position of the wire billet; in cooperation with rotation of the sanding belt 54 itself, the seam is ground circumferentially; upon completion of the grinding, the grinding part 5 moves away from the wire billet via the opening of the C-shaped plate 51. Now, all procedures, including wire billet butt welding, residual solder punching-off, and seam grinding, are completed. This realizes collective processing of the multiple procedures on the same equipment, significantly simplifying the process of wire billet butt-welding and improving production efficiency. Meanwhile, the punching-first grinding-later processing order may ensure the seam treatment efficiency and quality. The automatic actions described supra are all driven by corresponding drives, where one of the friction wheels 53 is driven by a drive to rotate to further bring the sanding belt 54 to rotate.

To enable a better cyclic operation, the disclosure further comprises a stock unloading part configured to move the ground wire billet away from the operating area so as to facilitate next round of wire billet welding. The stock unloading part comprises a stock pulling hook 81, a stock pulling cylinder 82, a stock unloading rail 83 and a stock unloading hook 84, the stock pulling cylinder 82 being fixed on an upper end of the vertical rail 7, the stock pulling hook 81 being fixed on an extension rod of the stock pulling cylinder 82, one end of the stock pulling hook 81 facing the area between the welding mechanism 3 and the welding-scar removing mechanism, the stock unloading rail 83 being mounted on an upper end of the welding mechanism 3 in the horizontal direction, the stock unloading hook 84 being slidingly connected on the stock unloading rail 83, a movement range of the stock unloading hook 84 being intersected with a movement range of the stock pulling hook 81. The stock unloading part enables hooking of the ground workpiece and pulling of the wire billet away from the operating part under the action of the stock pulling cylinder 82, such that the butt-welded wire billet exits the operation area to facilitate proceeding of next round, whereby automatic discharge is realized. Specifically, to unload, the stock pulling cylinder 82 drives the stock pulling hook 81 to access and hook the workpiece, and then drives the stock pulling hook 81 to move upward till the stock pulling hook 81 reaches the same height as the stock unloading hook 84; then, the stock unloading hook 84 moves horizontally to the position of the stock pulling hook 81 and then the stock pulling hook 81 moves downward slightly; at this point, the wire billet will fall onto the stock unloading hook 84 under the action of gravity; then, the stock unloading hook 84 slides reversely to hook the workpiece to pass over the upper portion of the welder, whereby the workpiece exits the operation area, which facilitates proceeding of next round of wire billet loading and welding. When the stock pulling cylinder 82 is pulling the wire billet, the fixing mechanisms on the welder need to loosen the wire billet.

It is to be understood that in an embodiment, the stock pulling hook 81 comprises a connecting portion 81.1 fixed to the stock pulling cylinder 82, a movable portion 81.2 hinged on the connecting portion 81.1, and a torsional spring connected between the connecting portion 81.1 and the movable portion 81.2, the movable portion 81.2 having a retracted state and a deployed state and being switchable between the retracted state and the deployed state, the torsional spring maintaining the movable portion 81.2 in the retracted state; during the process of the stock pulling cylinder 82 driving the stock pulling hook 81 to move downwards, the lower side of the movable portion 81.2 engages and abuts against the wire billet; the free end of the movable portion 81.2 is pushed by the wire billet to rotate upward by a certain angle, such that the movable portion 81.2 switches from the deployed state to the retracted state; after the movable portion 81.2 bypasses the wire billet, under the action of the torsional spring, the movable portion 81.2 switches back to the deployed state again from the retracted state; at this point, when the stock pulling cylinder 82 is driving the stock pulling hook 81 to move upwards, the movable portion 81.2 engages the wire billet again and hooks the workpiece to move upward.

It is to be understood that in another embodiment, an upper end of the cylinder body of the stock pulling cylinder 82 is hinged with the vertical rail, and a lower end of the cylinder body of the stock pulling cylinder 82 is connected to the vertical rail via an elastic member, thereby fixing the stock pulling cylinder 82 to the vertical rail. The stock pulling cylinder 82 has a first state and a second state and is switchable between the first state and the second state. The elastic member keeps the stock pulling cylinder 82 in the first state. During the process of the stock pulling cylinder 82 driving the stock pulling hook 81 to move downwards, the lower side of the stock pulling hook 81 engages and abuts against the wire billet. The stock pulling cylinder 82 is pushed by the wire billet to overcome the elastic force of the elastic member to rotate about the hinging axis and switch to the second state. After the stock pulling hook 81 bypasses the wire billet, the stock pulling hook 81 switches back from the second state to the first state again under the action of the elastic member; at this point, when the stock pulling cylinder 82 is driving the stock pulling hook 81 to move upwards, the stock pulling hook 81 re-engages the wire billet to hook the workpiece to move upwards. In this solution, the stock pulling hook 81 is not necessarily of a movable avoidance structure, which may be provided as a stationary structure so as to be more durable and reliable. In addition, the hinged position of the stock pulling cylinder 82 with respect to the vertical rail is distant from the stock pulling hook 81, such that respective structures at the hinged position, the position of the elastic member, and the position of the stock pulling hook 81 may constitute a lever structure upon engagement with the wire billet; in this way, even a small pushing force at the position of the stock pulling hook 81 may cause the stock pulling cylinder 82 to rotate, which prevents wire billet deformation due to excessive resistance. After the telescopic rod of the stock pulling cylinder 82 is retracted, the magnification effect of the lever structure is diminished, which ensures that when the other parts are operating, the stock pulling cylinder 82 may be securely fixed to the vertical rail, such that displacement and shake do not easily occur.

The welding mechanism 3 described herein comprises a welder, a first clamping unit, and a second clamping unit; a first straightening part 31 and a second straightening part 32 are disposed at two sides of the horizontal rail 1, straightening centers of the first straightening part 31 and the second straightening part 32 being located on a same linear line, centers of the first clamping unit and the second clamping unit being collinear and in flush with the straightening centers of the first straightening part 31 and the second straightening part 32, the welder being disposed between the first clamping unit and the second clamping unit, where the first clamping unit and the second clamping unit each comprise a lower positioning die 33 and an upper positioning die 34, one side of the upper positioning die 34 being rotatably connected on the lower positioning die 33, the lower positioning die 33 and the upper positioning die 34 being fitted with each other to form a holding cavity. The first straightening part 31 and the second straightening part 32 are configurable to straighten two coils of wire billet to be butt-weld joined, respectively; after the welding mechanism 3 moves to the wire billet position, the straightened wire billets are fixed by the first clamping unit and the second clamping unit, respectively; the fixed wire billets are then butt-welded end-to-head, where the first clamping unit and the second clamping unit each comprise a lower positioning die 33 and an upper positioning die 34, and one side of the upper positioning die 34 is rotatably connected on the lower positioning die 33; with this structural design, during operation, the wire billet can be held end-to-head by rotating; in addition, the two coils of wire billet are integrated after being welded, such that the rotationally connected structure may facilitate the integrally welded wire billet to exit the clamping unit without interference, thereby facilitating the welding mechanism 3 to discharge. The first straightening part 31 and the second straightening part 32 themselves may adopt existing straightening-enabled parts.

To guarantee a better welding effect, a shearing part 35 is provided at the side of the first straightening part 31 and the straightening part 32 proximal to the welder, respectively; the shearing part 35 comprises a hydraulic drive and a scissor, the scissor having a shear area whose central line is collinear with the central line of the corresponding straightening part. Provision of the shearing part 35 is to cut off the tip of the wire billet; since the wire coil tip usually has an oxidized layer, a blur, and a non-straightened portion, it needs to be cut off before welding so as to guarantee a better welding quality.

To ensure a stable punching effect, the punching part 4 described herein comprises a first clamping assembly 45, the first clamping assembly 45 comprising a left clamping unit and a right clamping unit, the left clamping unit comprising a lower-left stationary plate 451 and an upper-left movable plate 452, the right clamping unit comprising a lower-right stationary plate 453 and an upper-right movable plate 454, the upper-left punch head 41 being mounted on the upper-left movable plate 452, the lower-left punch head 42 being mounted on the lower-left stationary plate 451, the upper-right punch head 43 being mounted on the upper-right movable plate 454, the lower-right punch head 44 being mounted on the lower-right stationary plate 453, the connecting line between the centers of the upper-left punch head 41 and the lower-left punch head 42 being crisscrossed with the connecting line between the centers of the upper-right punch head 43 and the lower-right punch head 44, a V-shaped guide groove 464 being provided on each of the lower-left stationary plate 451, the upper-left movable plate 452, the lower-right stationary plate 453, and the upper-right movable plate 454, an arc-shaped portion with a same profile as the wire billet surface being formed at the bottom of the V-shaped guide groove 464. The first clamping assembly 45 can ensure a stable fixation effect, leading to a more stable punching operation; by arranging the four punch heads in a crisscrossed manner, when punching the welding scar, the four punch heads punch pairwise synchronously from both sides of the welding scar, which may ensure stable stress applied to the wire billet during punching, avoiding damages to the wire billet; moreover, the punching operation may significantly improve welding-scar removal efficiency; the design of V-shaped guide groove 464 facilitates locating of the wire billet. A drive is connected to the upper-left movable plate 452 and the upper-right movable plate 454, respectively, the drive being configured to drive the upper-left movable plate 452 and the upper-right movable plate 454 to move radially. The synchronous punching forms a circular punched area, and the punching directions of the four punch heads are along the axial direction of the wire billet; a drive is connected to each of the left clamping unit and the right clamping unit, the drive being configured to drive the left clamping unit and the right clamping unit to move axially, and during punching, the axial movement direction of the left clamping unit is opposite to that of the right clamping unit.

Figure 15:
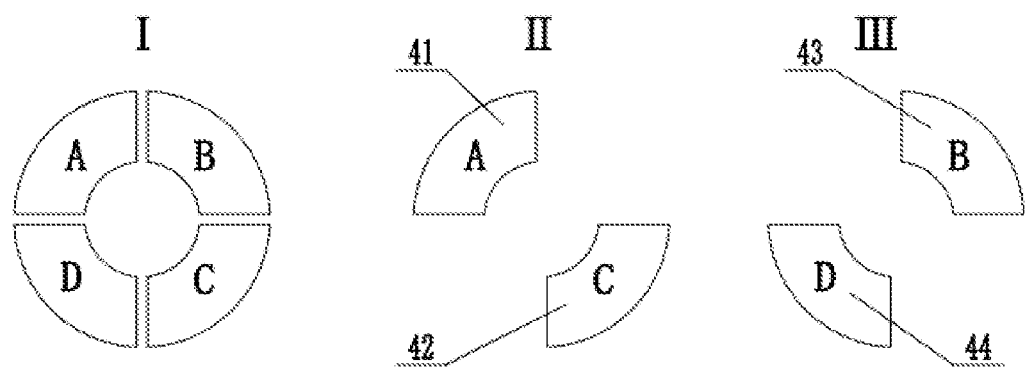
FIG. 15 is a cross-sectional structural view of four punch heads along the punching direction according to the disclosure.
Figure 16:
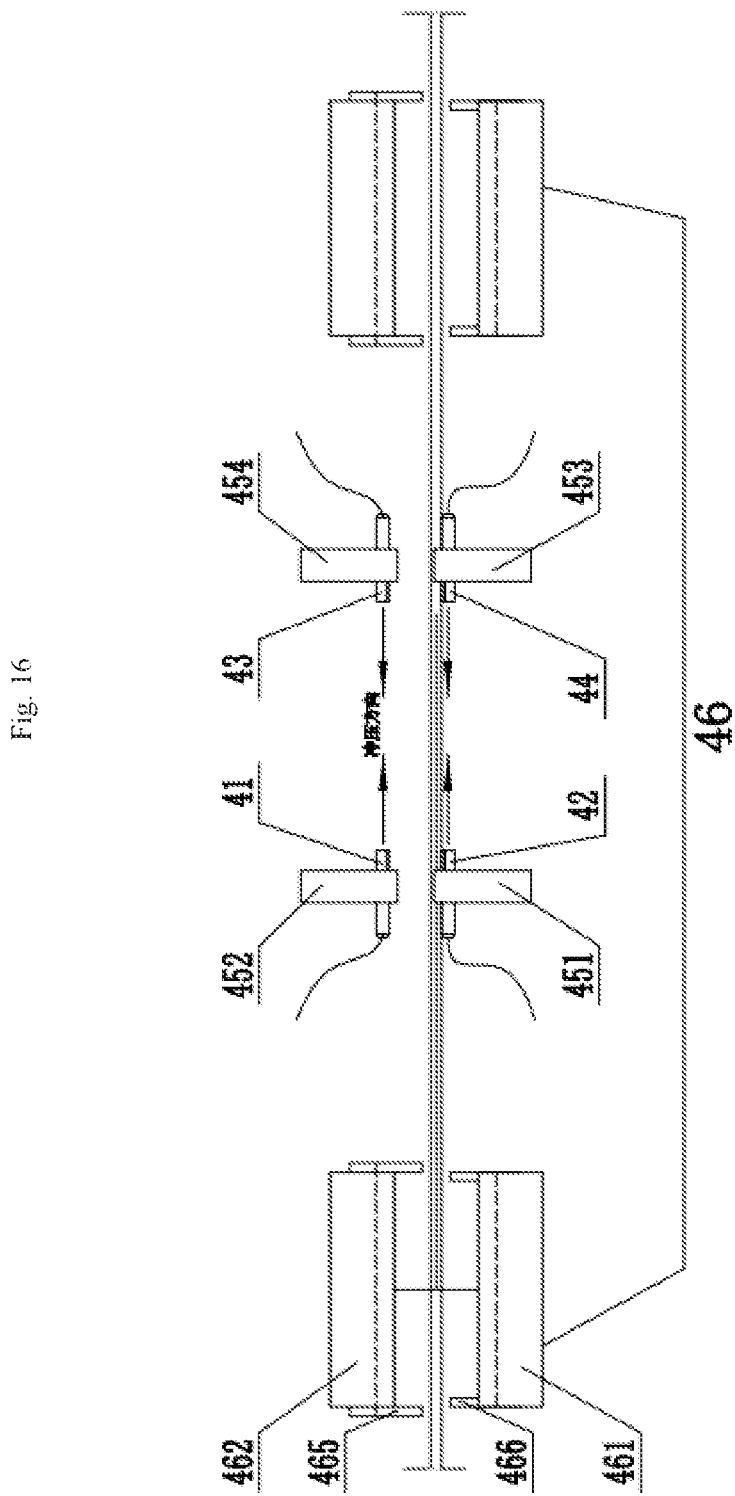
FIG. 16 is a structural distribution diagram of the punching part according to the disclosure.
Figure 17:
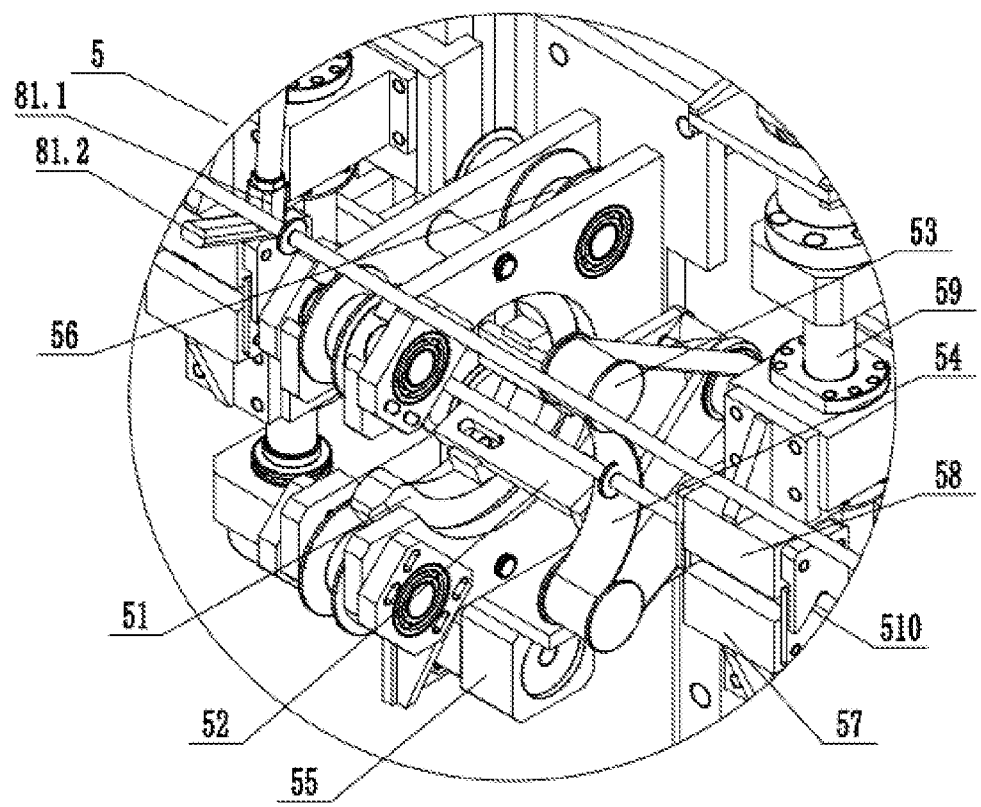
FIG. 17 is a local enlarged view of part E in FIG. 12 according to the disclosure.
Figure 18:
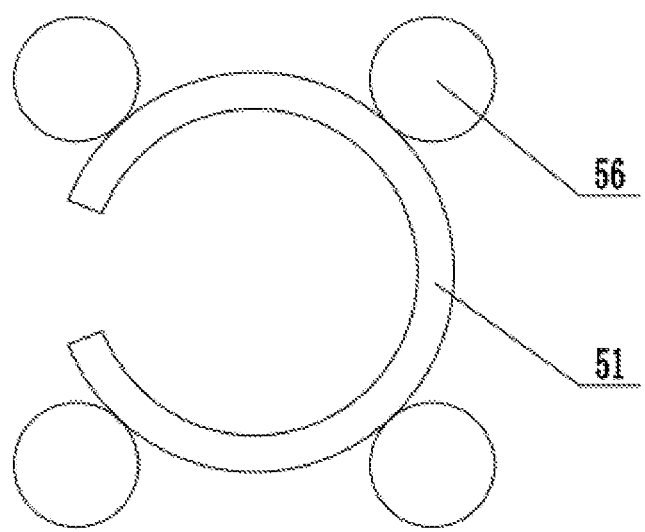
FIG. 18 is a structural schematic diagram of a C-shaped plate and a driving wheel according to the disclosure.
Figure 19:
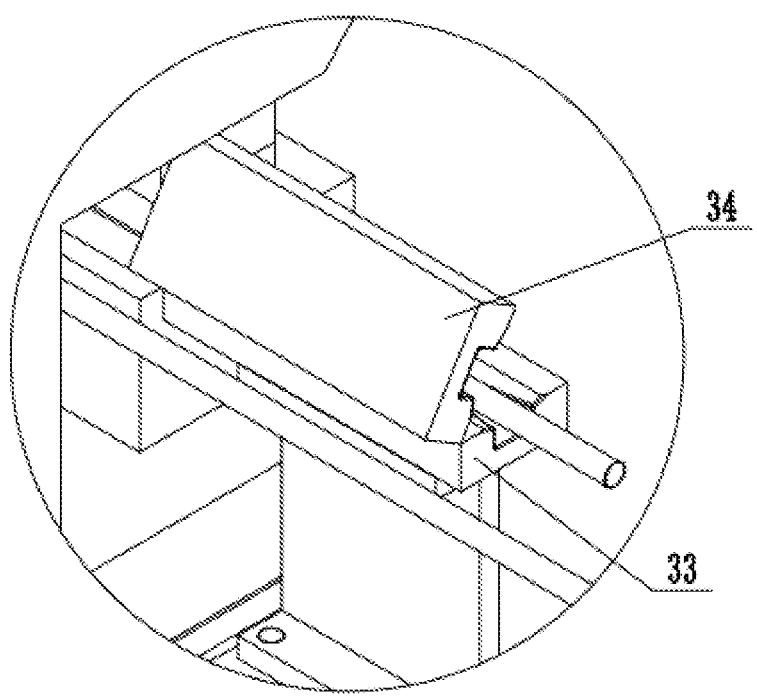
FIG. 19 is a partially enlarged view of a part F in FIG. 8 according to the disclosure.

To better understand the operation of the four punches, refer to FIG. 15, where I is the joint cross-sectional diagram of the punch heads at two sides, II and III are positional diagrams of the cross-sections of the punch heads at a single side, respectively, from which it can be seen that A and C are disposed at a same side, B and D at the other side; the connecting line between A and C is normal to the connecting line between B and D; upon punching, A and C move to the right side, and B and D move to the left side, whereby residual solders at the seam position are subjected to opposite acting forces.

Furthermore, the punching part 4 further comprises a second clamping assembly, the second clamping assembly comprising a second clamping unit disposed at two sides of the first clamping assembly 45, the clamping center line of the second clamping unit is collinear with the clamping center lines of the left clamping unit and the right clamping unit, the second clamping unit comprises a lower stationary die 461 and an upper movable die 462, each of the lower stationary die 461 and the upper movable die 462 being provided with an arc-shaped groove 463, a lower guide plate 466 being provided at both ends of the lower stationary die 461, an upper guide plate 465 being provided at both ends of the upper movable die 462, a V-shaped guide groove 464 being provided on each of the upper guide plate 465 and lower guide plate 466, a bottom of the V-shaped guide groove 464 being in communication with the arc-shaped groove 463. The second clamping assembly and the first clamping assembly 45 cooperate with each other to realize four-point wire billet locating and clamping, which ensures a more stable clamping effect. Provision of the arc-shaped groove 463 facilitates locating of the wire billet.

To achieve a better seam cleaning effect, respective cross sections of the upper-left punch head 41, the lower-left punch head 42, the upper-right punch head 43, and the lower-right punch head 44 are of a 90° sector structure; respective inner surfaces of the upper-left punch head 41, the lower-left punch head 42, the upper-right punch head 43, and the lower-right punch head 44 are of an arc shape with the same profile as the wire billet surface. The four punch heads jointly form a circular punched area, which may realize one-time welding-scar removal to the maximum extent; by providing an arc-shaped inner surface, the punch heads may be well fitted to the wire billet surface, which improves the welding-scar removal quality.

One of embodiments of the grinding part 5 described herein comprises a grinding clamping fixing portion and a grinding driving portion; the grinding driving portion comprises a drive motor, a driving wheel 56, and a synchronization belt, where four driving wheels 56 are provided and distributed outside the C-shaped plate 51, respective wheel faces of the four driving wheels 56 abutting against the outer wall of the C-shaped plate 51 to limit the C-shaped plate 51, an output end of the drive motor being connected to one of the driving wheels 56, the plurality of driving wheels 56 being connected via the synchronization belt, a rubber layer being applied over the outer sidewall of the C-shaped plate 51; the grinding clamping fixing portion is configured to clamp to-be-ground wire billet, the grinding clamping fixing portion comprising two grinding clamping unit distributed at two sides of the grinding part 5. Rotation of the C-shaped plate 51 is implemented via its friction with the driving wheels 56, whereby stepless rotation of the C-shaped plate 51 is realized; in this way, adaptive grinding may be performed dependent on different seam conditions of wire billet, e.g., different extents of grinding may be implemented by rotating the C-shaped plate 51 by different turns, in addition, this arrangement manner facilitates resetting of the C-shaped plate 51, thereby enhancing its continuous operation capability and efficiency.

The grinding clamping unit comprises a lower stationary die 57 and an upper movable die 58, an arc-shaped groove being provided on the lower stationary die 57 and the upper movable die 58, respectively, a lower guide plate being provided at each end of the lower stationary die 57, an upper guide plate being provided at each end of the upper movable die 58, a V-shaped guide groove 510 being provided on each of the upper guide plate and the lower guide plate, the bottom of the V-shaped guide groove 510 being in communication with the arc-shaped groove. The top-down snap-fitting structure between the lower stationary die 57 and the upper movable die 58 facilitates the wire billet to access the position for being fixed, and the design of arc-shaped groove facilitates locating of the wire billet and ensures a better fixation effect.

To facilitate entry of the wire billet and ensure the stability of the overall structure, the C-shaped plate 51 described herein has an opening with a radius angle of 40°-60°. The opening of the C-shaped plate 51 cannot be too large; otherwise, the C-shaped plate 51 would move unstably; while a too small opening is inconvenient for the wire billet to enter.

The integral butt-welder structure described herein can collectively process multiple procedures of wire billet butt-welding, including straightening, clamping, welding, seam welding-scar removing by punching, seal grinding, and unloading, which significantly enhances operating efficiency; in addition, during the operation, the workpiece does not move; orderly proceeding between various procedures is implemented by movement of the operating parts, whereby the product quality can be effectively guaranteed.

Embodiment 3

Figure 2:
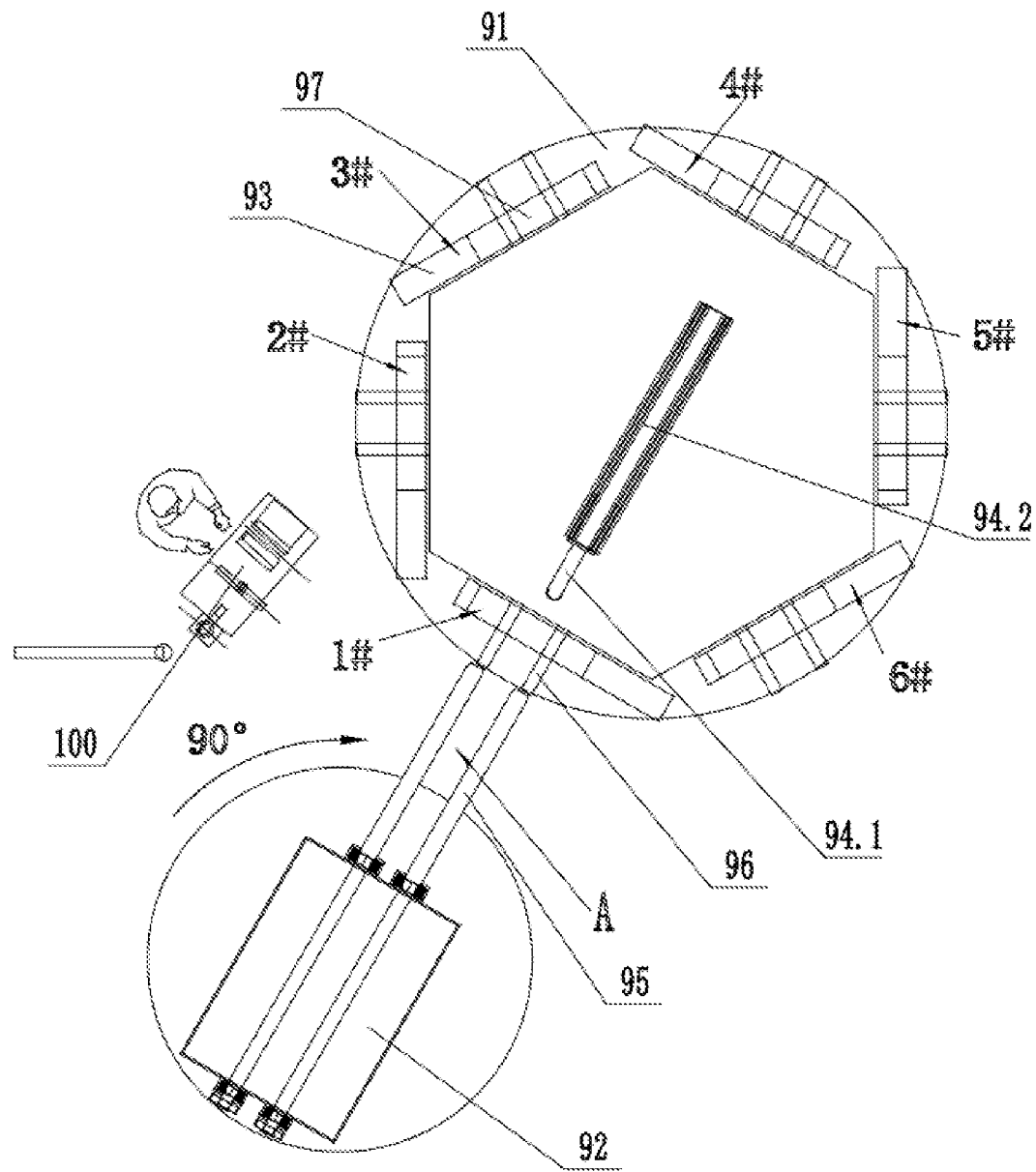
FIG. 2 is a state schematic diagram where a butt-welding stock receiver rotates till the stock receiving position corresponds to a first coil of wire billet according to the disclosure.
Figure 3:
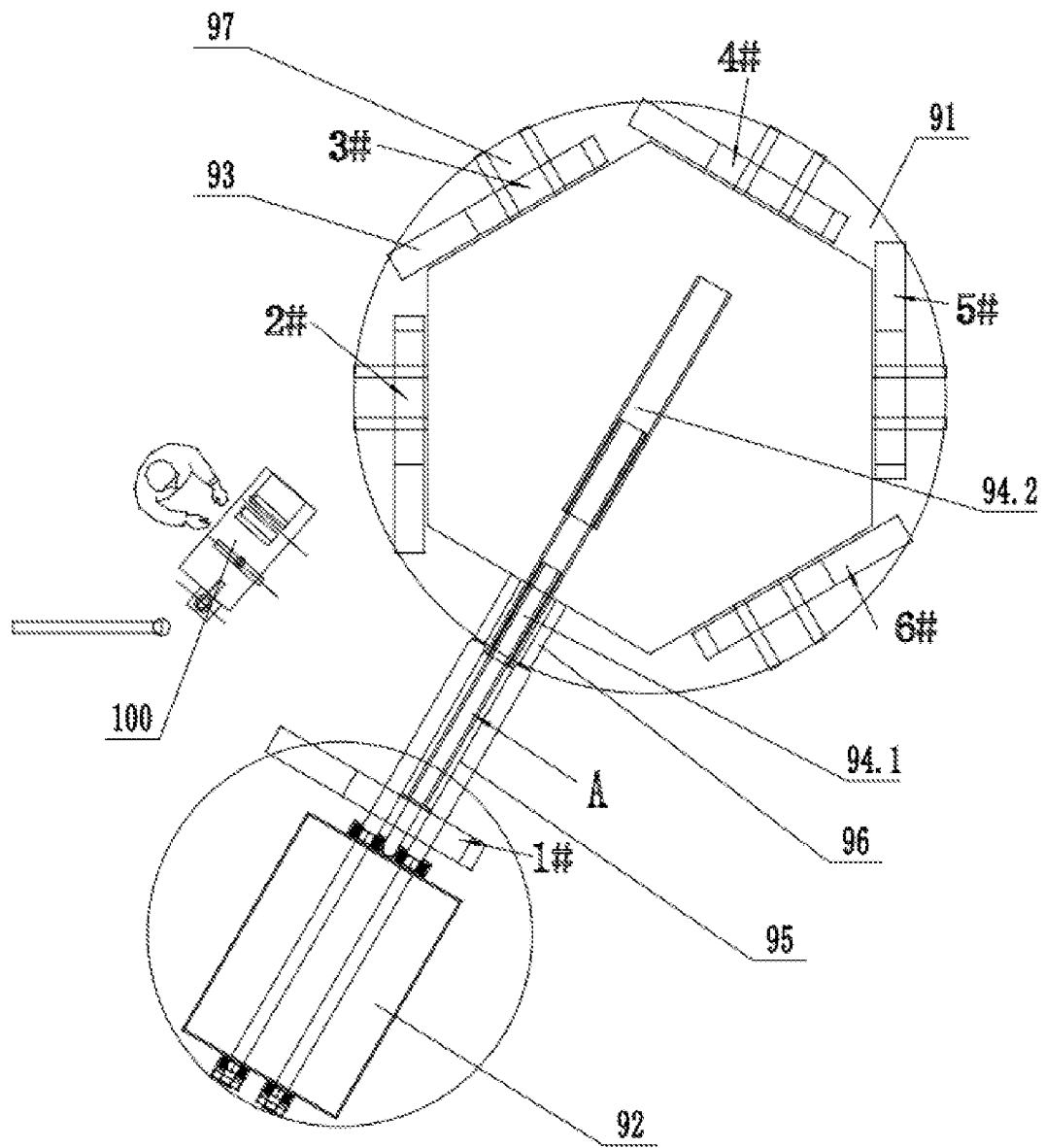
FIG. 3 is a state schematic diagram where a stock pushing mechanism 94 feeds the first coil of wire billet into the butt-welding stock receiver according to the disclosure.
Figure 4:
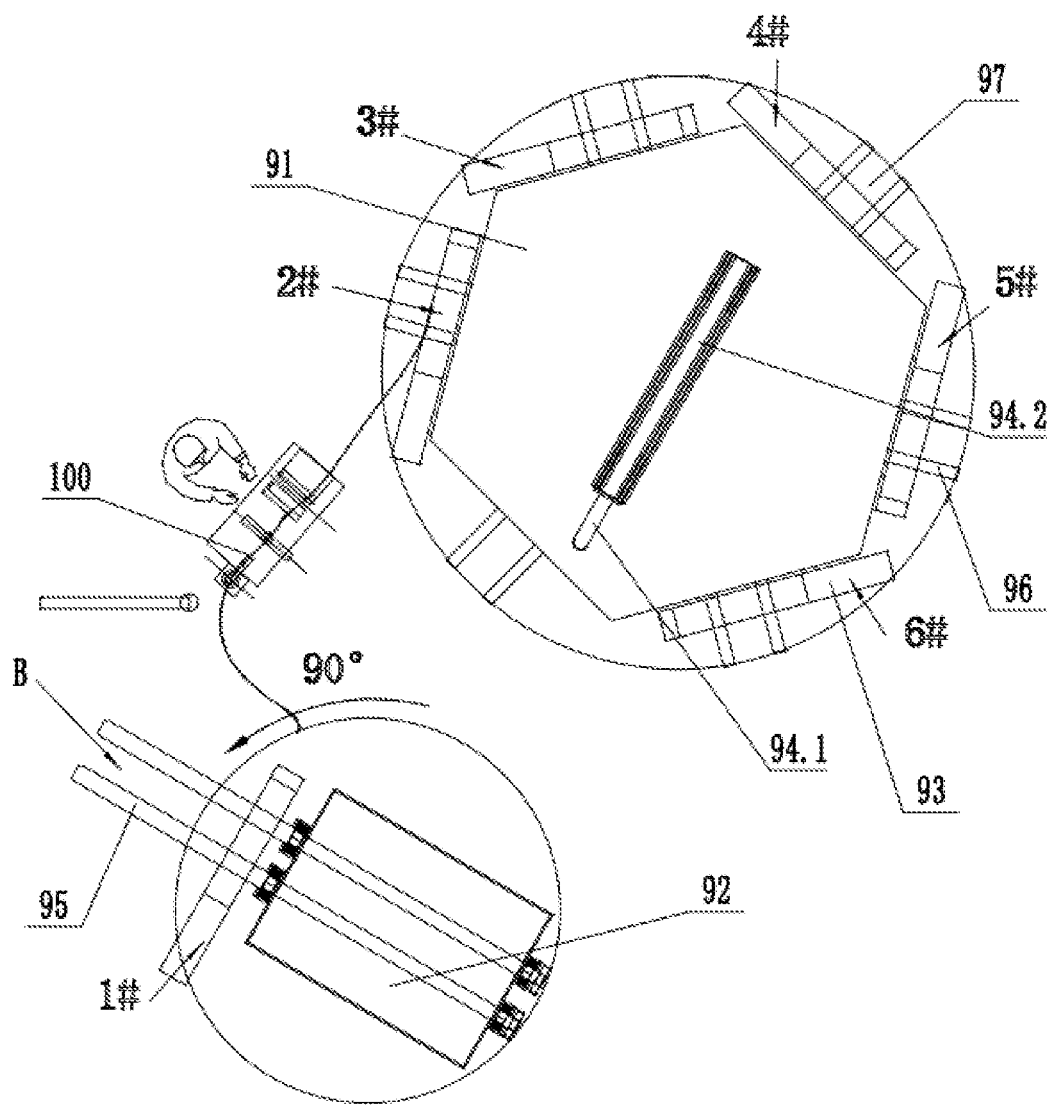
FIG. 4 is a state schematic diagram where the butt-welding stock receiver is disposed at the butt-welding position to perform a butt-welding operation according to the disclosure.
Figure 5:
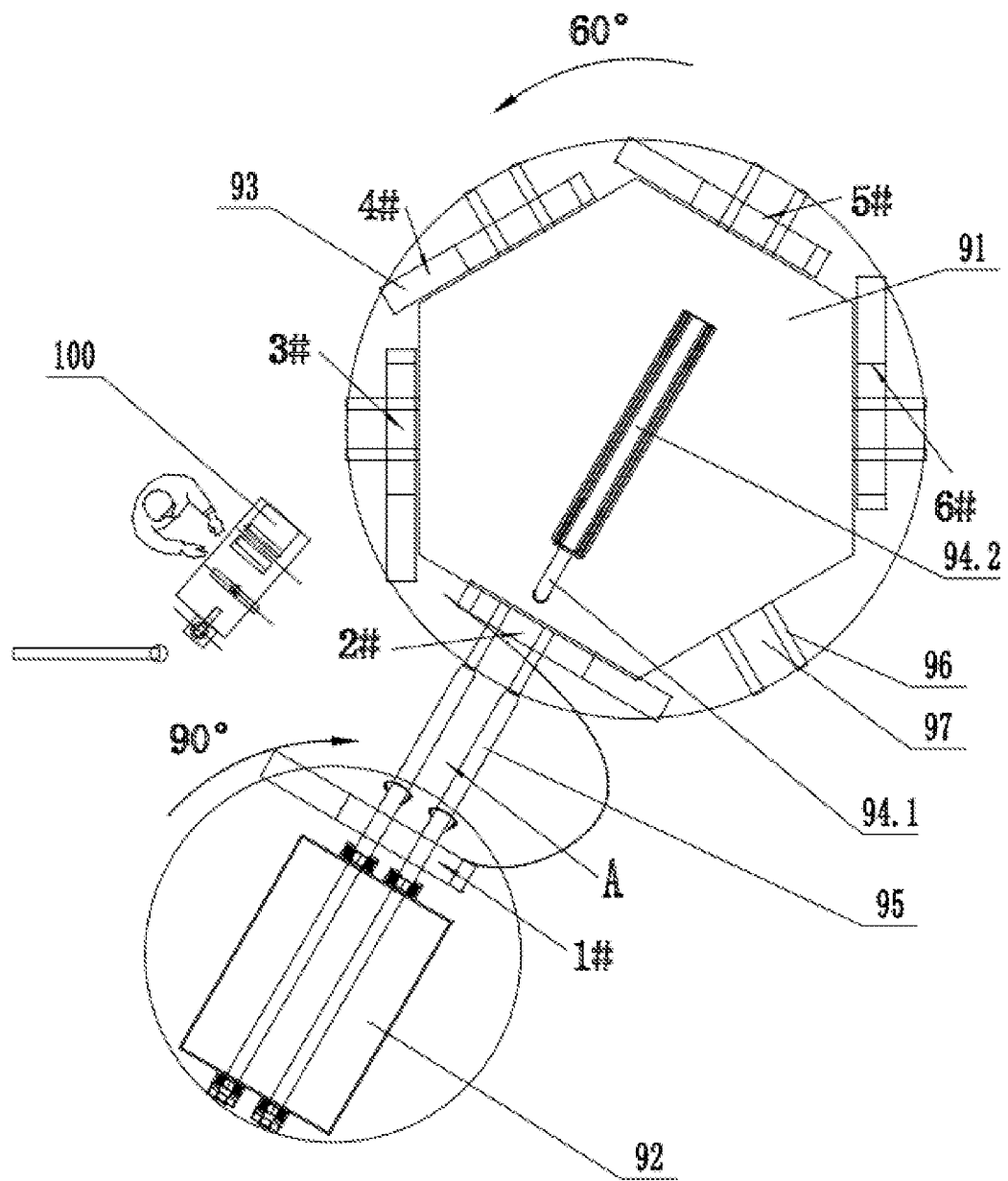
FIG. 5 is a state schematic diagram where the butt-welding stock receiver drives a coil of wire billet to flip at the stock receiving position upon completion of butt welding according to the disclosure.
Figure 6:
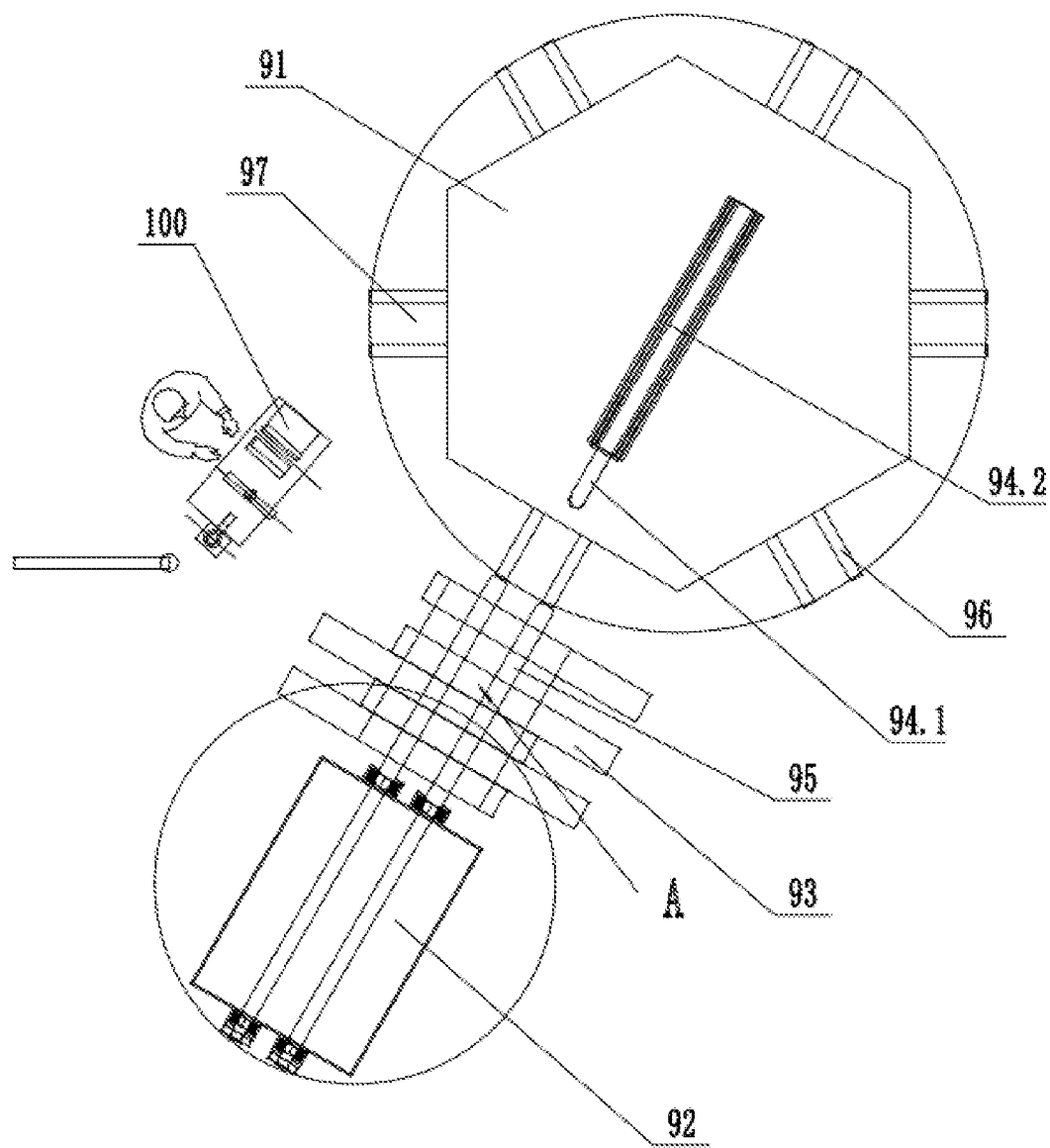
FIG. 6 is state schematic diagram where all coils of wire billet on a rotary plate have been transferred onto the butt-welding stock receiver according to the disclosure.

Referring to FIGS. 1 to 7, a wire billet butt-welding method implemented by the wire billet butt-welding apparatus described in Embodiment 1 and Embodiment 2 comprises:

S1: Pre-placing a plurality of coils of wire billet 93 ($1^{st}$ to $n^{th}$) circumferentially on a rotary plate 91 at an uniform interval; in the disclosure, the number of coils of wire billet 93 as pre-placed may be set dependent on actual needs, where a plurality of mounting portions 97 for placing the coils of wire billet 93 are provided on the rotary plate 91, each of the mounting portions 97 being provided with two mutually parallel mounting bars 96, where the mounting bars 96 pass through the central portion of the coil of wire billet 93 to realize support of the coil of wire billet 93. As illustrated in FIG. 6, this embodiment is illustrated with six coils of wire billet 93, where the six coils of wire billet 93 are distributed circumferentially; the butt-welding procedures proceed sequentially;

S2: Referring to FIG. 2, subjecting the butt-welding stock receiver 92 to rotate to stock receiving position A, feeding the first coil of wire billet into a stock receiving rod 95 of the butt-welding stock receiver 92; when the butt-welding stock receiver 92 rotates to the stock receiving position A, the stock receiving rod 95 and the mounting bars 96 are on the same linear line, where the stock receiving rod 95 comprises two rod bodies arranged in parallel at an interval; the spacing between the mounting bars 96 is equal to that between the rod bodies, such that the two rod bodies of the stock receiving rod 95 are aligned with the two mounting bars 96, respectively, thereby facilitating the coil of wire billet 93 to access the butt-welding stock receiver 92 from the rotary plate 91;

S3: Referring to FIG. 4, carrying, by the butt-welding stock receiver 92, the first coil of wire billet to rotate counterclockwise by 90° to butt-welding position B, and welding, by a wire billet butt-welder, the end of the first coil of wire billet to the head of a second coil of wire billet on the rotary plate 91, where the butt-welding operation may be manually performed on a welding workstation at the butt-welding position B, or may be automatically performed on the wire billet butt-welder; before the welding operation, the tips of the two to-be-welded coils of wire billet 93 need to be removed so as to prevent oxidized layer and blurs at the tips from affecting the welding quality;

S4: Referring to FIG. 5, upon completion of the welding in S3, subjecting the butt-welding stock receiver 92 to rotate again (clockwise by 90°) to the stock receiving position A, meanwhile, subjecting the rotary plate 91 to rotate by 360/n°; it is to be noted that since the first coil of wire billet and the second coil of wire billet have been butt-welded end-to-head, in order to prevent rupture of the wire billet during position change of the butt-welding stock receiver 92 and the rotary plate 91, the butt-welding stock receiver 92 and the rotary plate 91 need to move synchronously, where in this example embodiment, the butt-welding stock receiver 92 rotates clockwise by 90° to reach the stock receiving position A, and the rotary plate 91 rotates counterclockwise by 60° such that the second coil of wire billet reaches the stock receiving position A; after the two coils of wire billet both reach the stock receiving position A, the method proceeds to the step S5; the stock receiving rod 95 rotates to tighten the wire billet between the first coil of wire billet and the second coil of wire billet; the tightening herein refers to tightly winding the loose wire billet between the butt-welded first coil of wire billet and second coil of wire billet such that they are re-ordered into one integral coil, which may be specifically implemented by self-spinning of the stock receiving rod 95; the two rod bodies described herein may rotate synchronously about the same axis. Since the stock receiving rod 95 is inserted in the inner hole of the coil of wire billet 93, the stock receiving rod 95 and the coil of wire billet 93 in which it is inserted may be circumferentially fixed via friction or other connecting structures, whereby the coil of wire billet 93 is rotated as the two rod bodies rotate, which realizes self-flipping of the coil of wire billet 93; in this way, the loose wire billet between the two coils of wire billet is automatically tightly wound during the welding procedure, which ensures integrity of the two butt-weld joined coils of wire billet 93.

Figure 7:
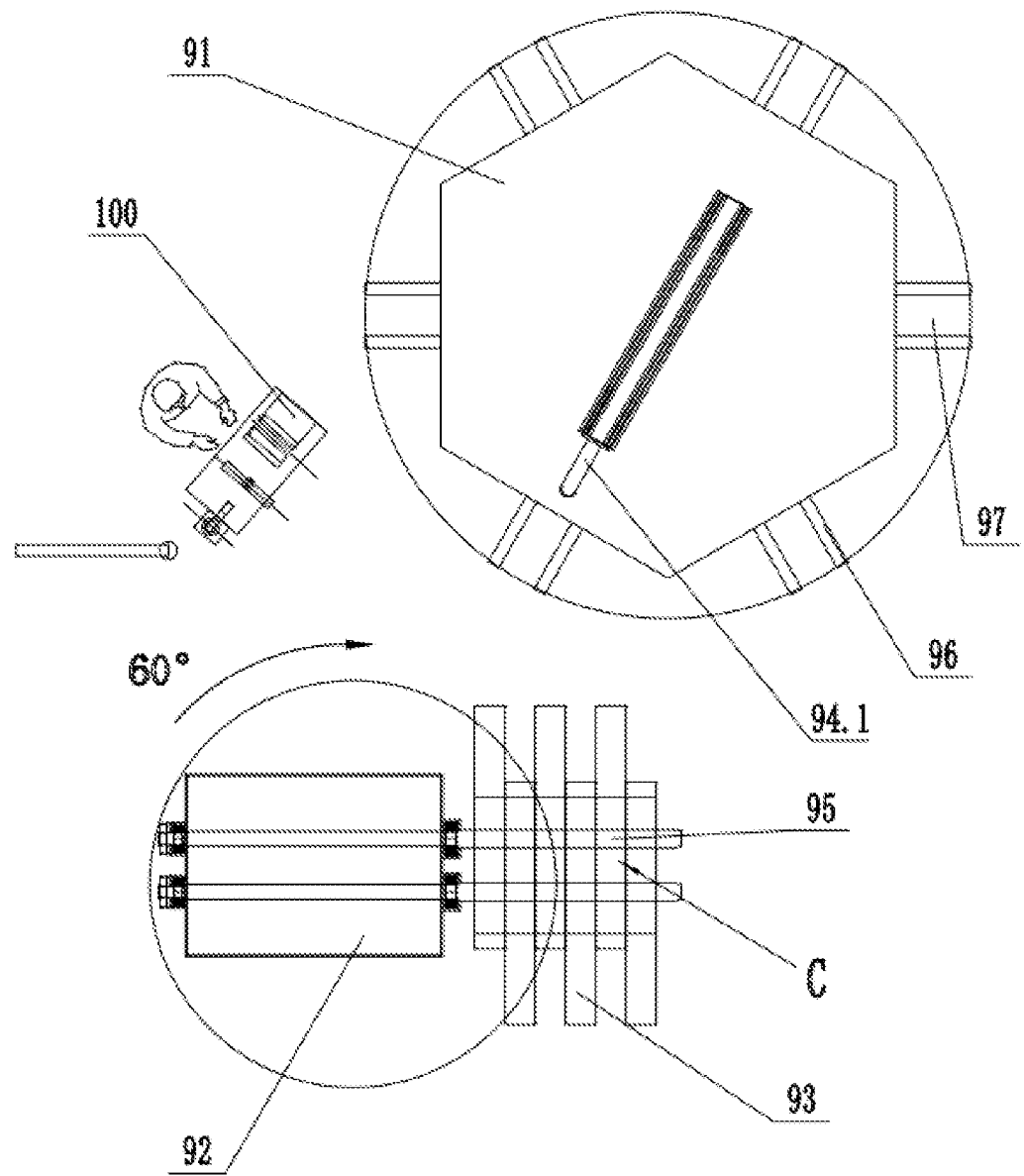
FIG. 7 is a state schematic diagram where the butt-welding stock receiver rotates to a stock discharging position upon completion of all butt-welding operations according to the present invention.
Figure 8:
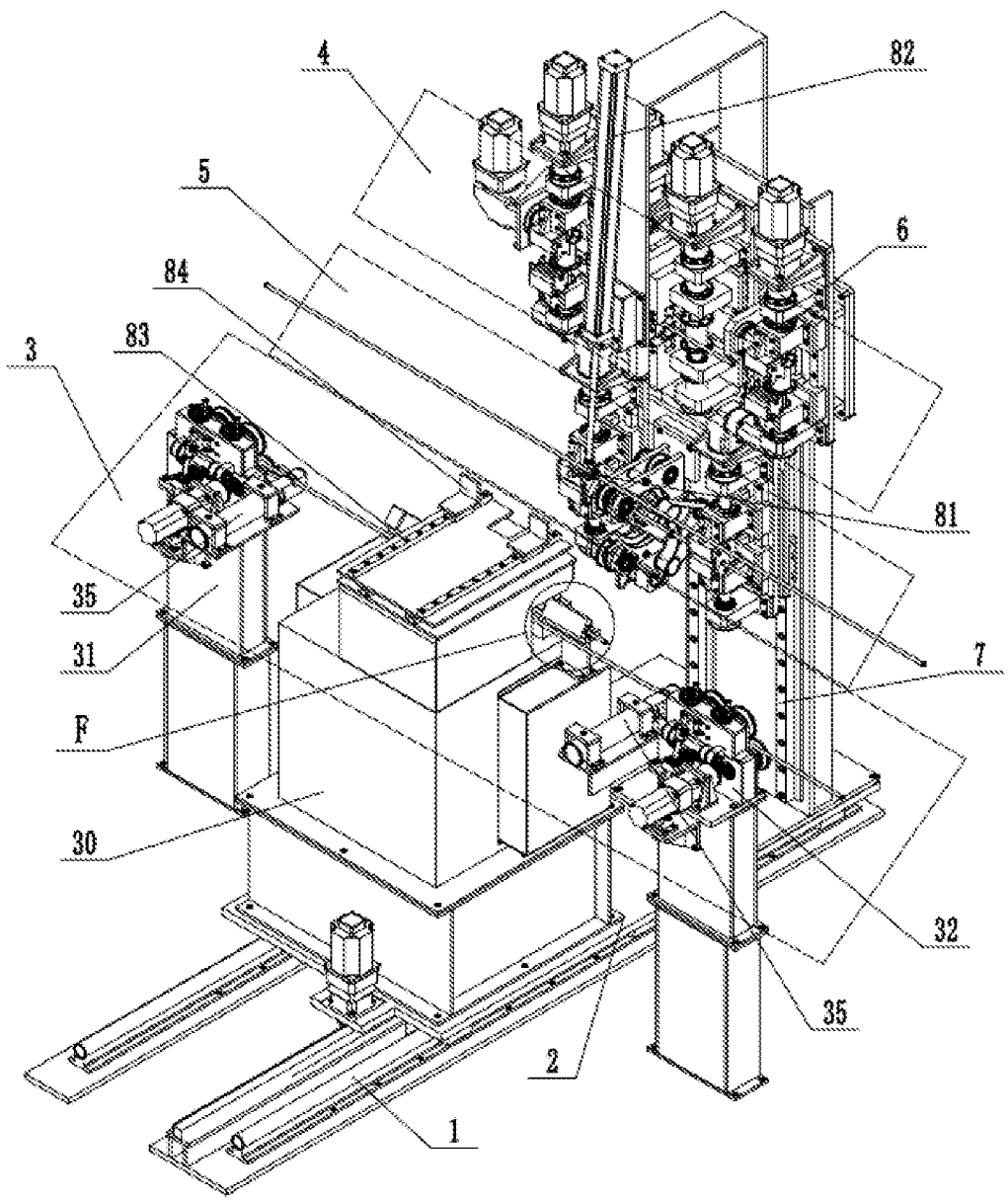
FIG. 8 is a stereoscopic diagram of an overall structure of a wire billet butt-welder according to the disclosure.
Figure 9:
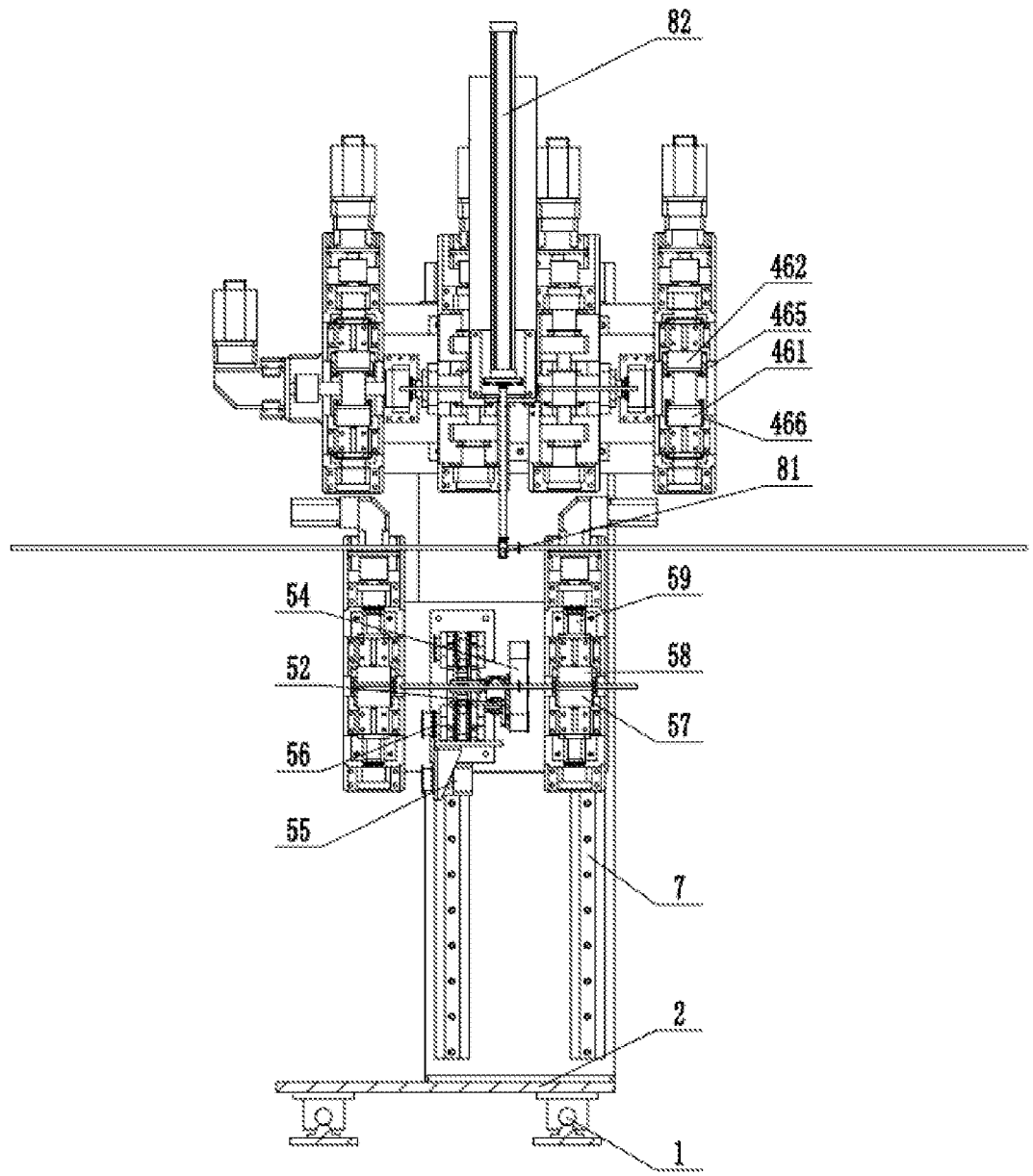
FIG. 9 is a main view of a welding-scar removing mechanism according to the disclosure.
Figure 10:
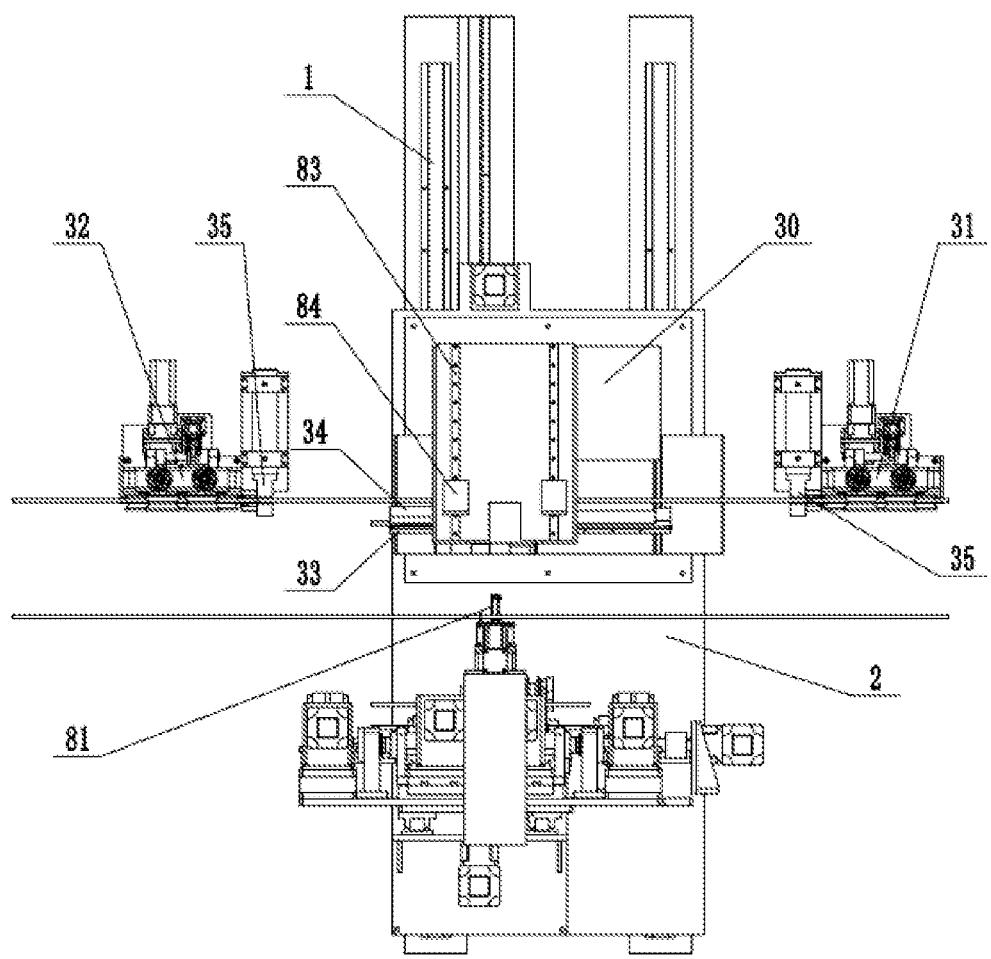
FIG. 10 is a top view of the wire billet butt-welder according to the disclosure.
Figure 11:
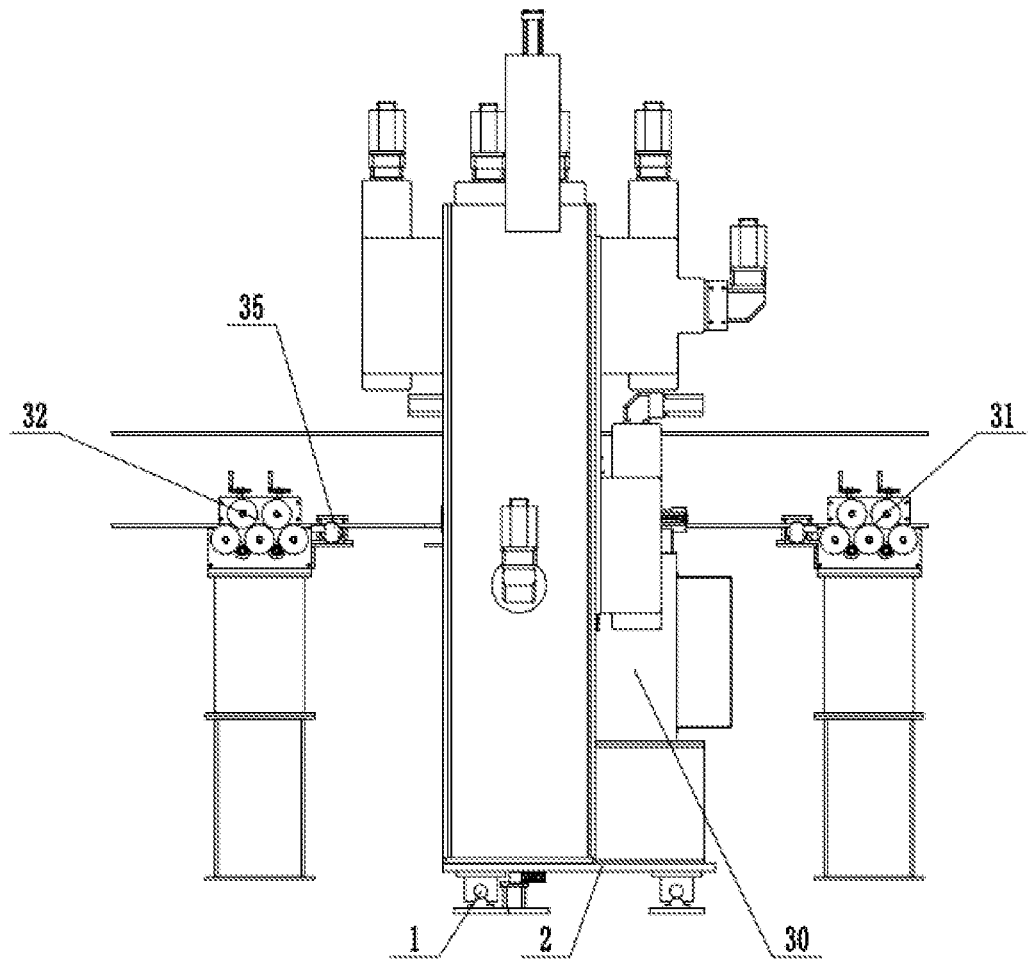
FIG. 11 is a rear view of the wire billet butt-welder according to the disclosure.
Figure 12:
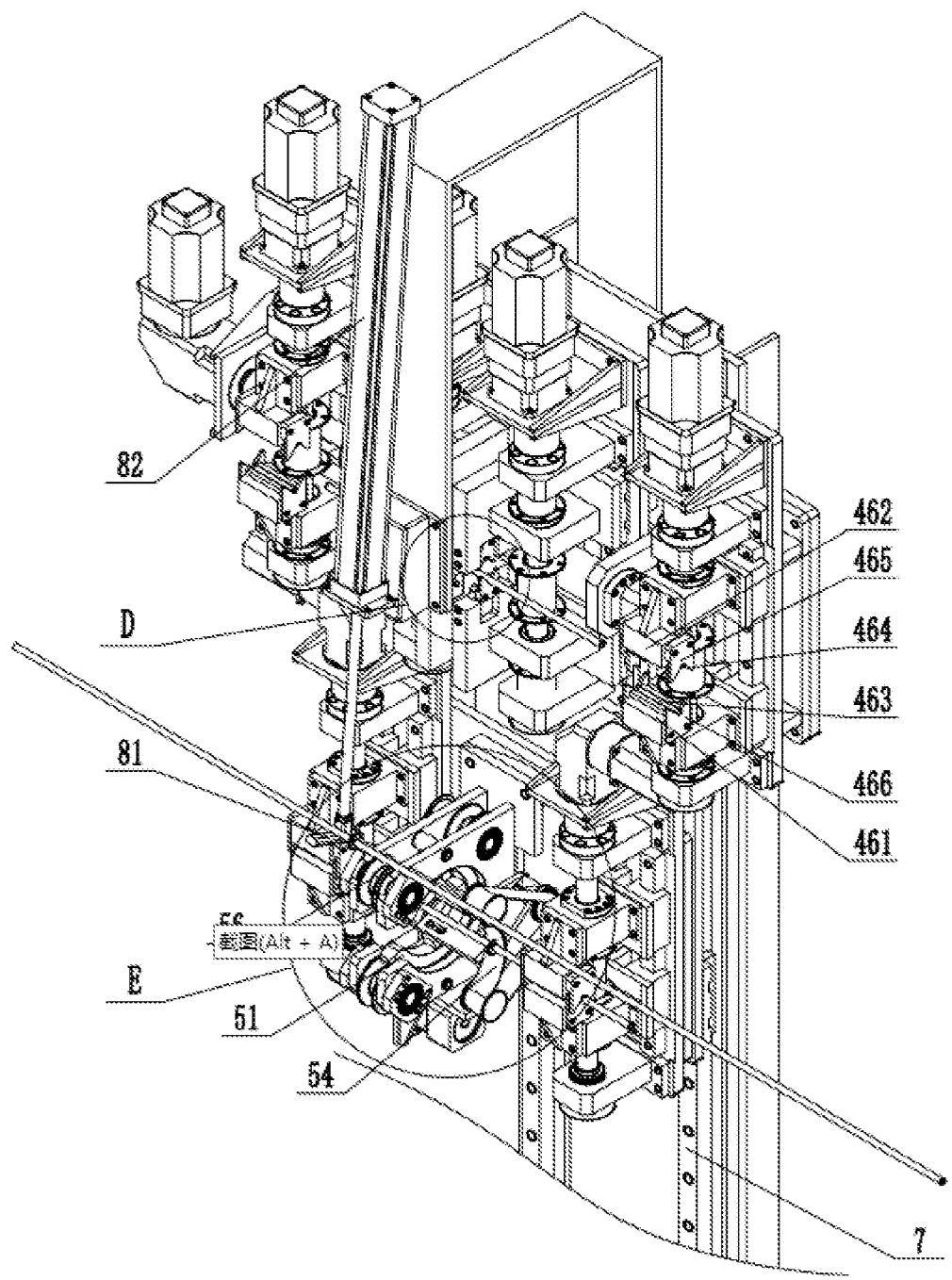
FIG. 12 is a structural stereoscopic diagram of the welding-scar removing mechanism according to the disclosure.
Figure 13:
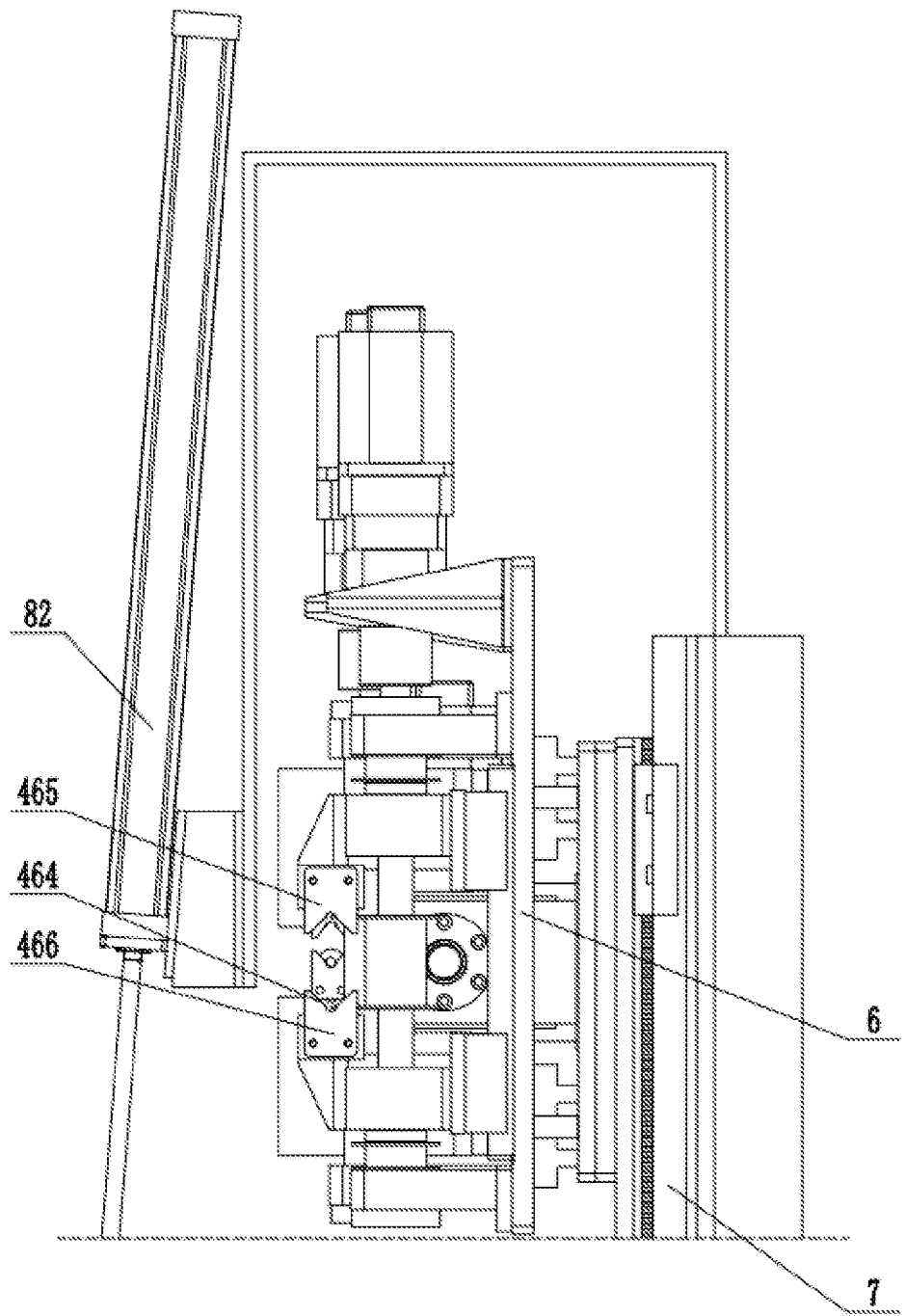
FIG. 13 is a side view of a punching part according to the disclosure.
Figure 14:
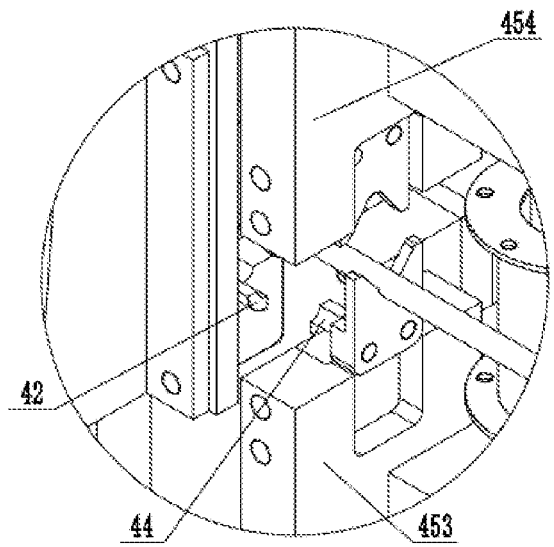
FIG. 14 is a local enlarged view of part D in FIG. 12 according to the disclosure.

S5: After the loose wire billet between the first coil of wire billet and the second coil of wire billet is wound tightly, feeding, by a stock pushing mechanism 94, the second coil of wire billet to the stock receiving rod 95 of the butt-welding stock receiver 92;

S6: Repeating the steps S3-S5 to sequentially perform butt-welding operations with respect to the $3^{rd}$ to $6^{th}$ coils of wire billet 93; in this way, butt-welding of all coils of wire billet 93 is completed, and all coils of wire billet 93 are welded into a whole coil;

S7: Referring to FIG. 7, subjecting the butt-welding stock receiver 92 to rotate clockwise to stock discharging position C, whereby the butt-welded $1^{st}$ to $6^{th}$ coils of wire billet are discharged as a whole.

It is seen that the butt-welding method described herein realizes semi-automatic butt-welding operation, and with the rotary plate 91 and the butt-welding stock receiver 92, automatic loading, automatic flipping, and automatic discharge are enabled, which reduces the manual workload and the safety hazards while improving the production efficiency.

The number n of the coils of wire billet in the disclosure may be 4, 5, or 6, which may be set dependent on production needs, thereby offering more flexibility to the production.

Embodiment 4

This embodiment differs from the Embodiment 3 in that in step S4, while the second coil of wire billet is rotating to the stock receiving position, the stock receiving rod rotates to synchronously tighten the wire billet between the first coil of wire billet and the second coil of wire billet. In the technical solution described supra, tightening refers to winding the loose wire billet between the butt-welded first and second coils of wire billet, such that it is wound integrally into the first coil of wire billet, thereby guaranteeing integrity of the two butt-welded coils of wire billet, avoiding the loose wire billet between the coils of wire billet from affecting transportation or from being damaged due to collision with other structures in subsequent transportation and processing. While the second coil of wire billet is rotating to the stock receiving position, it is synchronously tightened. The tightening may also occur when the rotary plate and the butt-welding stock receiver are rotating, preventing loose wire from being bent and damaged, or from being bent by clamping, whereby product quality may be improved. Remaining procedures of this embodiment are identical to Embodiment 2.

What have been described supra are only specific implementations of the disclosure; however, the scope of protection of the disclosure is not limited thereto. Those skilled in the art shall appreciate that the disclosure includes, but is not limited to, the contents described in the drawings and the specific implementations. Any modification without departing from the functions and structural principles of the disclosure will be included in the scope of the appended claims.

We claim:

1. A wire billet butt-welding apparatus, comprising: a rotary plate and a butt-welding stock receiver, the rotary plate and the butt-welding stock receiver being arranged in adjacency, a stock receiving rod being provided on the butt-welding stock receiver, the butt-welding stock receiver being rotatable to enable the stock receiving rod to switch between a butt-welding position, a stock receiving position, and a stock discharging position, a plurality of mounting portions being circumferentially provided on the rotary plate, each mounting portion being rotatable about a central axis of the rotary plate, a stock pushing mechanism being configured to push a coil of wire billet from the mounting portion to the stock receiving rod being provided in a central portion of the rotary plate.

2. The wire billet butt-welding apparatus according to claim 1, further comprising a wire billet butt-welder, the wire billet butt-welder being disposed at the butt-welding position.

3. The wire billet butt-welding apparatus according to claim 1, wherein the stock receiving rod comprises two rod bodies arranged in parallel at an interval, the two rod bodies being mutually independent and rotatable synchronously about a same axis.

4. The wire billet butt-welding apparatus according to claim 3, wherein each of the mounting portions is provided with two mounting bars parallel to each other and equally spaced from the two rod bodies.

5. The wire billet butt-welding apparatus according to claim 1, wherein the stock pushing mechanism comprises a stock pushing rod and a stock push driving part, wherein while the mounting portion is rotating, the stock pushing mechanism stays still such that one end of the stock pushing rod keeps facing the stock receiving position, and the stock push driving part drives the stock pushing rod to perform an intermittent retract-extend motion.

6. The wire billet butt-welding apparatus according to claim 1, wherein the butt-welding position and the stock discharging position are distributed at two sides of the stock receiving position.

7. The wire billet butt-welding apparatus according to claim 2, wherein the wire billet butt-welder comprises a horizontal rail and a sliding platform slidingly connected on the horizontal rail, a welding mechanism and a welding-scar removing mechanism which are oppositely disposed being fixed on the sliding platform, the welding-scar removing mechanism comprising a punching part, a grinding part, a sliding rack, and a vertical rail, the vertical rail being fixed on the sliding platform, the punching part and the grinding part being fixed on the sliding rack and slidingly connected to the vertical rail via the sliding rack, wherein the grinding part is disposed below the punching part.

8. The wire billet butt-welding apparatus according to claim 7, wherein the wire billet butt-welder further comprises a stock unloading part, the stock unloading part comprising a stock pulling hook, a stock pulling cylinder, a stock unloading rail, and a stock unloading hook, the stock pulling cylinder being fixed to an upper end of the vertical rail, the stock pulling hook being fixed on an extension rod of the stock pulling cylinder, one end of the stock pulling hook facing an area between the welding mechanism and the welding-scar removing mechanism, the stock unloading rail being mounted at an upper end of the welding mechanism along a horizontal direction, the stock unloading hook being slidingly connected on the stock unloading rail, a movement range of the stock unloading hook being intersected with a movement range of the stock pulling hook.

9. A wire billet butt-welding method, implemented by the wire billet butt-welding apparatus according to claim 1, comprising:
   S1: pre-placing a plurality of coils of wire billet on the rotary plate in a circumferential direction;
   S2: rotating a butt-welding stock receiver to a stock receiving position, and feeding a first coil of wire billet to the stock receiving rod of the butt-welding stock receiver;
   S3: carrying, by the butt-welding stock receiver, the first coil of wire billet to rotate to the butt-welding position, and welding the first coil of wire billet to a second coil of wire billet end-to-head;
   S4: rotating the butt-welding stock receiver to the stock receiving position again, and meanwhile, rotating the rotary plate such that the second coil of wire billet rotates to the stock receiving position;
   S5: feeding, by the rotary plate, the second coil of wire billet to the stock receiving rod of the butt-welding stock receiver;
   S6: repeating S3-S5 to sequentially perform butt-welding operation with respect of $3^{rd}$-$n^{th}$ coils of wire billet;
   S7: rotating the butt-welding stock receiver to rotate to the stock discharging position, whereby the butt-welded $1^{st}$-$n^{th}$ coils of wire billet are discharged as an integral coil.

10. The wire billet butt-welding method according to claim 9, wherein in S5, before the rotary plate feeds the second coil of wire billet to the stock receiving rod of the butt-welding stock receiver, the stock receiving rod is rotated to tighten wire billet between the first coil of wire billet and the second coil of wire billet.

11. The wire billet butt-welding method according to claim 9, wherein in S4, while the second coil of wire billet is rotated to the stock receiving position, the stock receiving rod is rotated to synchronously tighten wire billet between the first coil of wire billet and the second coil of wire billet.

* * * * *